(12) United States Patent
Lee et al.

(10) Patent No.: US 9,523,881 B2
(45) Date of Patent: Dec. 20, 2016

(54) LIQUID CRYSTAL DISPLAY DEVICE AND MANUFACTURING METHOD THEREOF

(71) Applicant: Samsung Display Co., Ltd., Yongin, Gyeonggi-do (KR)

(72) Inventors: Min-Woo Lee, Yongin (KR); Dae Ho Song, Yongin (KR); Woo Jae Lee, Yongin (KR)

(73) Assignee: Samsung Display Co., Ltd., Gyeonggi-do (KR)

(*) Notice: Subject to any disclaimer, the term of this patent is extended or adjusted under 35 U.S.C. 154(b) by 95 days.

(21) Appl. No.: 14/461,617

(22) Filed: Aug. 18, 2014

(65) Prior Publication Data

US 2015/0160509 A1 Jun. 11, 2015

(30) Foreign Application Priority Data

Dec. 10, 2013 (KR) ........................ 10-2013-0153341

(51) Int. Cl.
*G02F 1/1335* (2006.01)
*G02F 1/1333* (2006.01)
*G02F 1/1341* (2006.01)

(52) U.S. Cl.
CPC ... *G02F 1/133528* (2013.01); *G02F 1/133377* (2013.01); *G02F 1/1341* (2013.01)

(58) Field of Classification Search
CPC .............................................. G02F 1/133528
See application file for complete search history.

(56) References Cited

U.S. PATENT DOCUMENTS

| 7,190,503 | B2 | 3/2007 | Ide |
| 7,515,326 | B2 | 4/2009 | Selbrede et al. |
| 7,586,580 | B2 | 9/2009 | Matsuda et al. |
| 7,609,355 | B2 | 10/2009 | Nouchi et al. |
| 7,667,786 | B2 | 2/2010 | Nouchi et al. |
| 7,667,891 | B2 | 2/2010 | Cok et al. |
| 7,847,912 | B2 | 12/2010 | Nishizawa et al. |
| 7,920,223 | B2 | 4/2011 | Nishizawa et al. |

(Continued)

FOREIGN PATENT DOCUMENTS

| JP | 2010-008875 | 1/2010 |
| JP | 2010-217702 | 9/2010 |

(Continued)

*Primary Examiner* — Paisley L Arendt
*Assistant Examiner* — Edmond Lau
(74) *Attorney, Agent, or Firm* — Knobbe Martens Olson & Bear LLP

(57) ABSTRACT

A liquid crystal display includes: a substrate including a plurality of pixel areas; a TFT disposed on the substrate; a pixel electrode connected with the TFT and disposed on the TFT; a common electrode positioned on the pixel electrode and separated from the pixel electrode by a microcavity; a roof layer disposed on the common electrode; an injection hole disposed in the common electrode and the roof layer along a long-axial direction of the substrate to expose a part of the microcavity; a liquid crystal layer filling the microcavity; a first polarizer having a polarization axis in a short-axial direction of the substrate on the roof layer; and a second polarizer having a polarization axis in a long-axial direction of the substrate below the substrate, in which heights of edges in the long-axial and short-axial directions of the substrate are larger than a height of the center of the substrate.

8 Claims, 21 Drawing Sheets

(56) References Cited

U.S. PATENT DOCUMENTS

| | | |
|---|---|---|
| 2002/0001187 A1 | 1/2002 | Murofushi |
| 2007/0146616 A1 | 6/2007 | Nouchi et al. |
| 2009/0021162 A1 | 1/2009 | Cope et al. |
| 2009/0096965 A1* | 4/2009 | Nagata .............. G02F 1/133305 349/103 |
| 2009/0122223 A1 | 5/2009 | Hayano et al. |
| 2009/0201443 A1 | 8/2009 | Sasaki et al. |
| 2009/0284904 A1 | 11/2009 | Wu et al. |
| 2009/0316062 A1 | 12/2009 | Nishizawa |
| 2010/0033648 A1 | 2/2010 | Kaganezawa |
| 2010/0147030 A1 | 6/2010 | Rietbergen et al. |
| 2010/0164860 A1 | 7/2010 | Misono |
| 2010/0238370 A1 | 9/2010 | Matsumoto |
| 2010/0289983 A1 | 11/2010 | Rocard et al. |
| 2011/0019129 A1 | 1/2011 | Nishizawa et al. |
| 2011/0090713 A1 | 4/2011 | Chen et al. |
| 2011/0096262 A1 | 4/2011 | Kikuchi |
| 2011/0228190 A1 | 9/2011 | Yang et al. |
| 2011/0255039 A1 | 10/2011 | Enomoto |
| 2012/0020056 A1 | 1/2012 | Yamagata et al. |
| 2012/0033160 A1* | 2/2012 | Tashiro ............. G02F 1/133707 349/103 |
| 2012/0044618 A1 | 2/2012 | Lee |
| 2012/0062448 A1* | 3/2012 | Kim .................. G02F 1/133377 345/55 |
| 2012/0300298 A1* | 11/2012 | Yu ...................... G02B 27/2285 359/478 |
| 2012/0320509 A1 | 12/2012 | Kim et al. |

FOREIGN PATENT DOCUMENTS

| | | |
|---|---|---|
| JP | 2011-085740 | 4/2011 |
| KR | 10-2012-0119111 | 10/2012 |

\* cited by examiner

FIG. 2
(a)
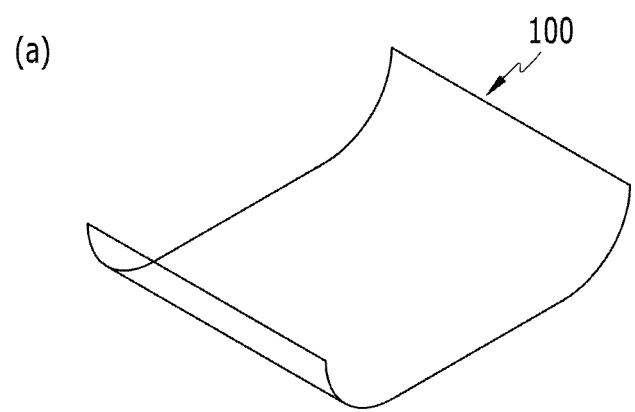
(b)
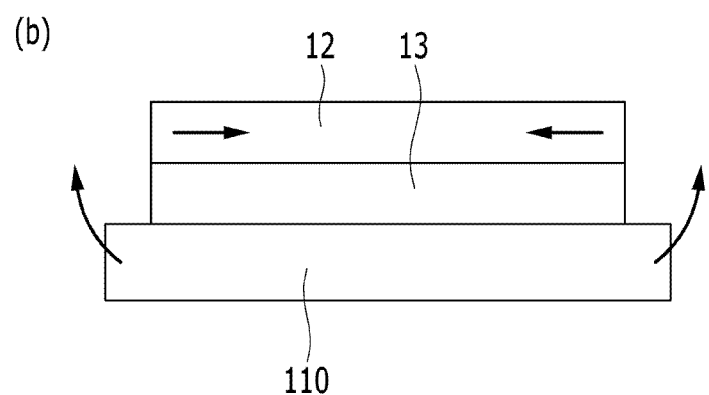

FIG. 16
(a)
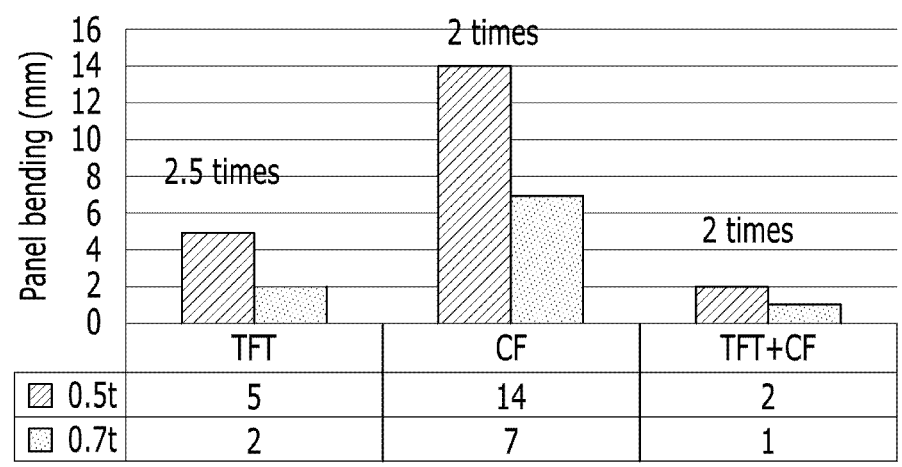
(b)
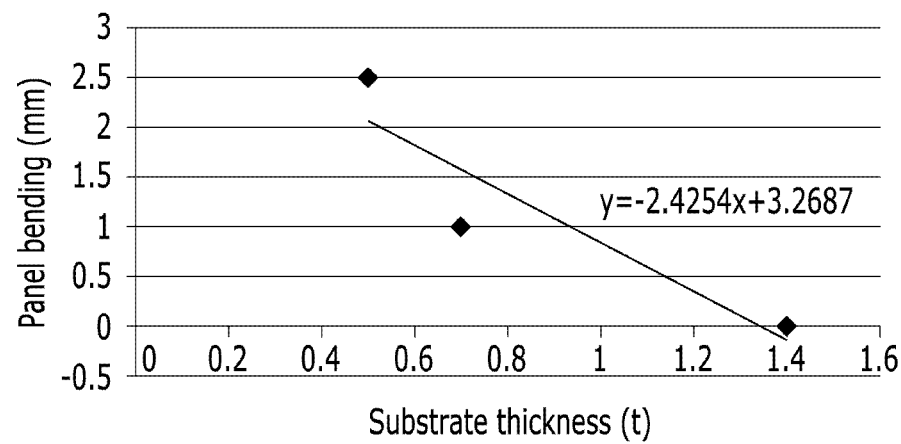

FIG. 17
(a)
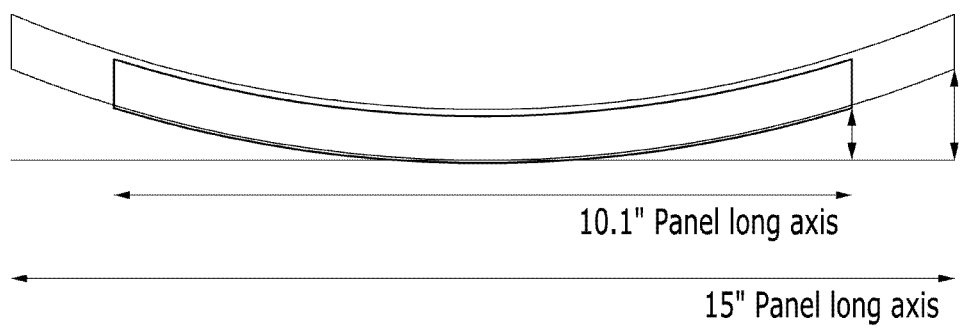
10.1" Panel long axis
15" Panel long axis
(b)
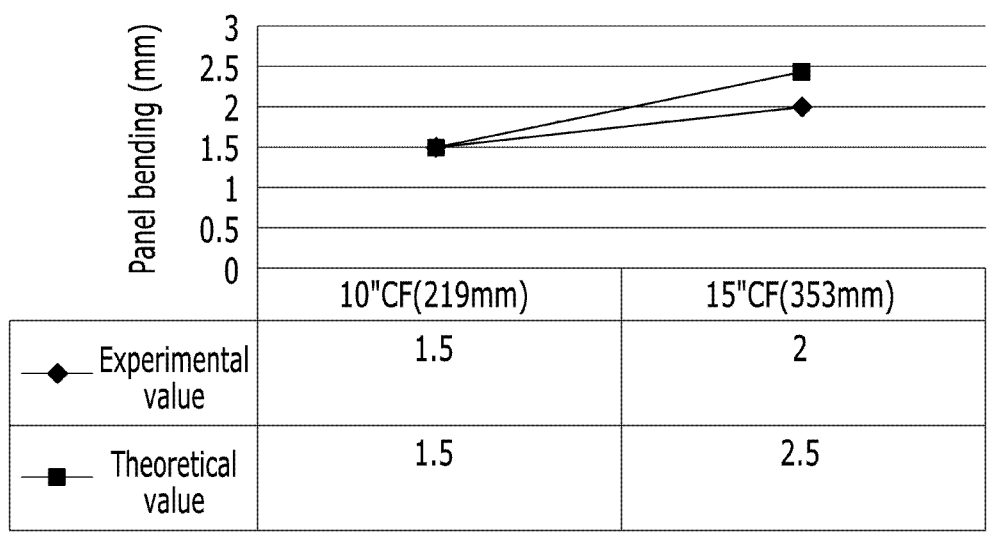

FIG. 19
(a)
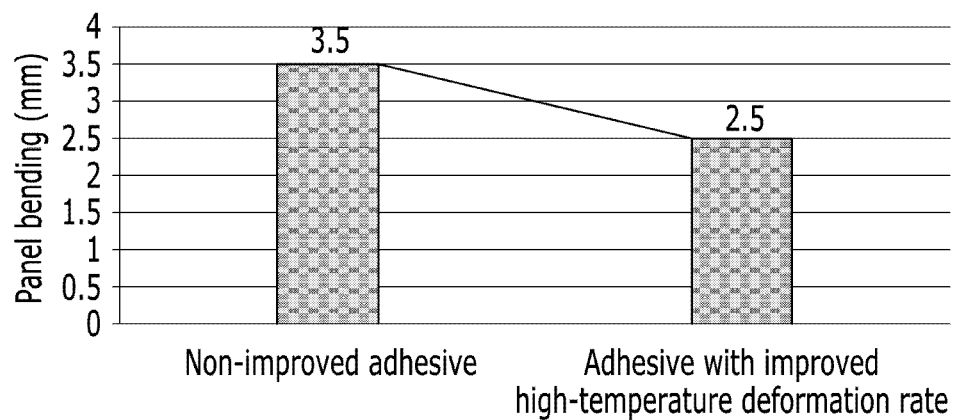
(b)
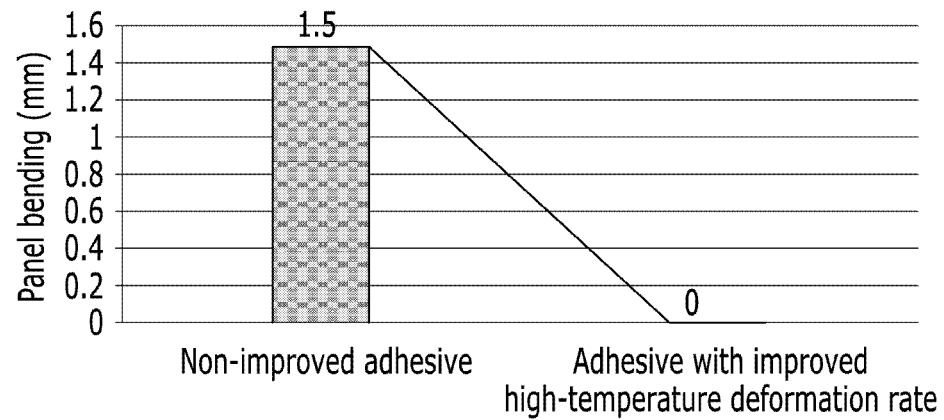

FIG. 20
(a)
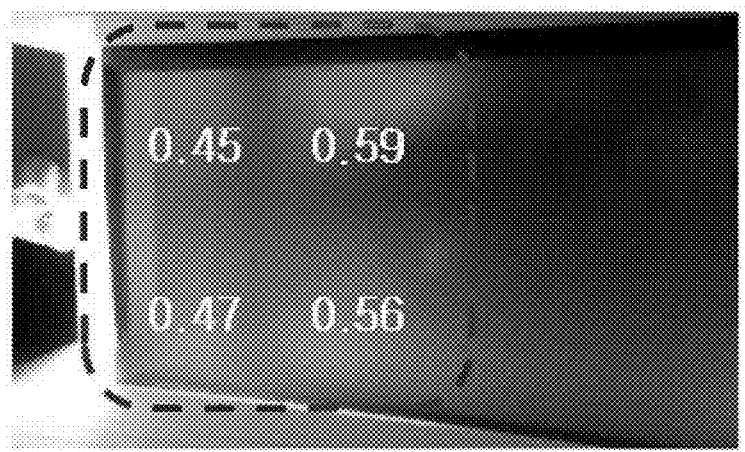
(b)

LIQUID CRYSTAL DISPLAY DEVICE AND MANUFACTURING METHOD THEREOF

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to and the benefit of Korean Patent Application No. 10-2013-0153341 filed in the Korean Intellectual Property Office on Dec. 10, 2013, the entire contents of which are incorporated herein by reference.

BACKGROUND

Field

The present disclosure relates to a liquid crystal display including a liquid crystal layer (nano crystal) existing in a microcavity having a curved shape, and a manufacturing method thereof.

Description of the Related Technology

A liquid crystal display which is one of the most common types of flat panel displays currently in use, includes two sheets of display panels with field generating electrodes, such as a pixel electrode and a common electrode, and a liquid crystal layer interposed therebetween. The liquid crystal display generates an electric field in the liquid crystal layer by applying voltage to the field generating electrodes, determines the direction of liquid crystal molecules of the liquid crystal layer by the generated electric field, and controls polarization of incident light, thereby displaying images.

As the liquid crystal display has been used as a display device of a television receiver, a size of the screen has been increased. As such, as the size of the liquid crystal display is increased, there may be a problem in that a viewing difference between a case where a viewer views a center of the screen and a case where the viewer views left and right ends of the screen is increased. In order to compensate for the viewing difference, the display device is curved in a concave shape to be formed in a curved shape.

The above information disclosed in this Background section is only for enhancement of understanding of the background of the disclosure and therefore it may contain information that does not form the prior art that is already known in this country to a person of ordinary skill in the art.

SUMMARY OF CERTAIN INVENTIVE ASPECTS

The present disclosure has been made in an effort to provide a curved liquid crystal display formed having a liquid crystal layer (nano crystal) existing in a microcavity formed in a curved shape by using a contraction property of a polarizer attached to a surface of the liquid crystal display under a high-temperature and humidity condition and a tensile stress generated in a roof layer of the liquid crystal display having an EM structure, and a manufacturing method thereof.

Further, the present disclosure has been made in an effort to provide a liquid crystal display having excellent presence by compensating for a viewing difference as a screen is increased because curved surfaces are formed at both axes including a long axis and a short axis of the liquid crystal display, and a manufacturing method thereof.

One embodiment provides a liquid crystal display, including: a substrate including a plurality of pixel areas; a thin film transistor disposed on the substrate; a pixel electrode connected with the thin film transistor and disposed on the thin film transistor; a common electrode positioned on the pixel electrode and separated from the pixel electrode by a microcavity; a roof layer disposed on the common electrode; an injection hole disposed in the common electrode and the roof layer along a long-axial direction of the substrate to expose a part of the microcavity; a liquid crystal layer configured to fill the microcavity; a first polarizer having a polarization axis in a short-axial direction of the substrate on the roof layer; and a second polarizer having a polarization axis in a long-axial direction of the substrate below the substrate, in which heights of edges in the long-axial and short-axial directions of the substrate is larger than a height of the center of the substrate.

The substrate may have a concaved hemispherical shape.

The liquid crystal display may further include a first adhesive layer disposed between the first polarizer and the roof layer; and a second adhesive layer disposed between the second polarizer and the substrate, in which the first adhesive layer may include a material which is deformed according to a temperature, and the second adhesive layer may include a material which is not deformed according to a temperature.

The temperature may be between about 50 to about 70° C.

A polarization axis of the first polarizer may be vertical to a polarization axis of the second polarizer.

The first polarizer and the second polarizer may each include at least one of polyvinyl alcohol (PVA), polyethylene terephthalate (PET), triacetyl cellulose (TAC), or acryl.

The roof layer may include an organic material.

The roof layer may be disposed to form a plurality of rows along the long-axial direction of the substrate.

The liquid crystal display may further include an overcoat between the first polarizer and the roof layer.

The curved liquid crystal display may have constant distances from all surfaces of the curved liquid crystal display based on a user which is spaced apart from the center of the curved liquid crystal display in a vertical direction at a predetermined distance.

Another embodiment provides a manufacturing method of a liquid crystal display, including: forming a thin film transistor on a substrate; forming a pixel electrode on the thin film transistor; forming a sacrificial layer on the pixel electrode; forming a common electrode on the sacrificial layer; forming a roof layer and an injection hole on the common electrode in a long-axial direction of the substrate; forming a microcavity between the pixel electrode and the common electrode by removing the sacrificial layer; forming a liquid crystal layer by injecting a liquid crystal material into the microcavity; attaching a first polarizer having a polarization axis in a short-axial direction of the substrate on the roof layer; attaching second polarizer having a polarization axis in a long-axial direction of the substrate below the substrate; and heat-treating the substrate to be bent only in a polarization axial direction of the first polarizer and a direction of the roof layer, in which heights of edges in the long-axial and short-axial directions of the substrate is larger than a height of the center of the substrate.

The heat treatment of the substrate may be performed at 50 to 70° C. for 50 to 300 hours.

According to embodiments, it is possible to have excellent presence by compensating for a viewing difference as a screen is increased because curved surfaces are formed at both axes including a long axis and a short axis of a liquid crystal panel.

Further, it is possible to improve spots due to light leakage and have excellent luminance by forming a curved surface in the liquid crystal panel itself without external force, when the liquid crystal panel has the curved surface.

BRIEF DESCRIPTION OF THE DRAWINGS

FIG. 2 is a diagram illustrating a principle of forming a curved surface of a panel short axis of the curved liquid crystal display according to an embodiment.

FIG. 16 is a graph illustrating a result of measuring a bending degree of a panel according to a substrate thickness of a curved liquid crystal display according to an embodiment.

FIG. 17 is a graph illustrating a result of measuring a bending degree of a panel according to a panel size of a curved liquid crystal display according to an embodiment.

FIG. 19 is a graph illustrating measuring a bending degree of a panel according to a kind of adhesive in a curved liquid crystal display according to an embodiment.

FIG. 20 is a result of measuring luminance values of a curved liquid crystal display according to an embodiment and a curved liquid crystal display according to a Comparative Example.

DETAILED DESCRIPTION OF CERTAIN INVENTIVE EMBODIMENTS

Figure 1:
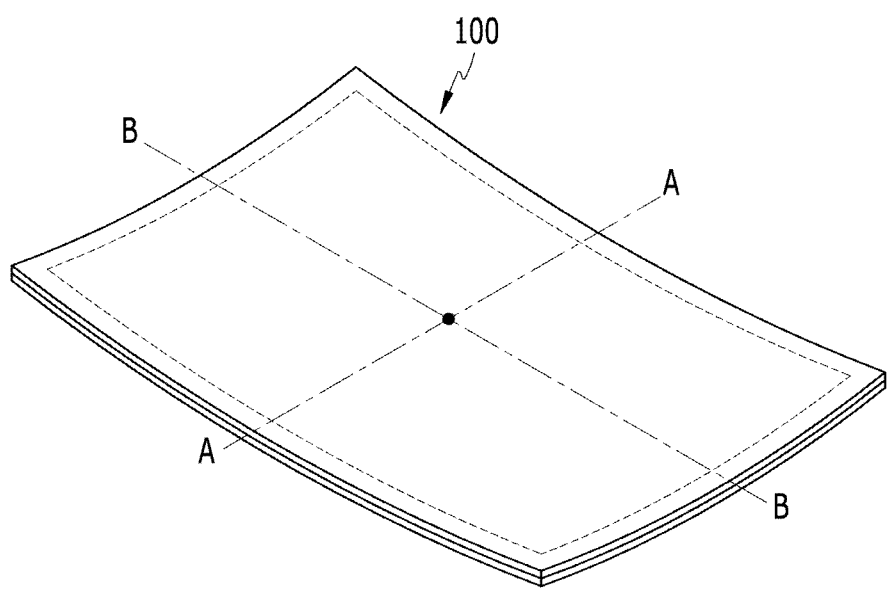
FIG. 1 is a perspective view illustrating a curved liquid crystal display according to an embodiment.

The present disclosure will be described more fully hereinafter with reference to the accompanying drawings, in which certain embodiments of the invention are shown. As those skilled in the art would realize, the described embodiments may be modified in various ways, without departing from the spirit or scope of the present invention.

In the drawings, the thickness of layers, films, panels, regions, etc., may be exaggerated for clarity. Like reference numerals generally designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

When the liquid crystal display is curved in a concave shape to be formed in a curved shape, compression force is applied to a substrate positioned inside the curved surface of two substrates by a sealant surrounding edges of the two substrates of the liquid crystal display, and as a result, the two substrates are not equally curved. As such, when the two substrates are not equally curved, a gap between the two substrates, a cell gap, is not uniform, and when the cell gap of the liquid crystal display is not uniform, display quality may deteriorate.

A liquid crystal display having an embedded microcavity (EM) structure (nano crystal structure) is a display device manufactured by forming a sacrificial layer with a photoresist, removing the sacrificial layer after coating a support member thereon, and filling a liquid crystal in an empty space formed by removing the sacrificial layer. In liquid crystal display having the EM structure, there is a difference in that a roof layer exists instead of an upper substrate unlike a general liquid crystal display.

First, a liquid crystal display according to an embodiment will be described in detail with reference to FIGS. 1 to 3.

Figure 3:
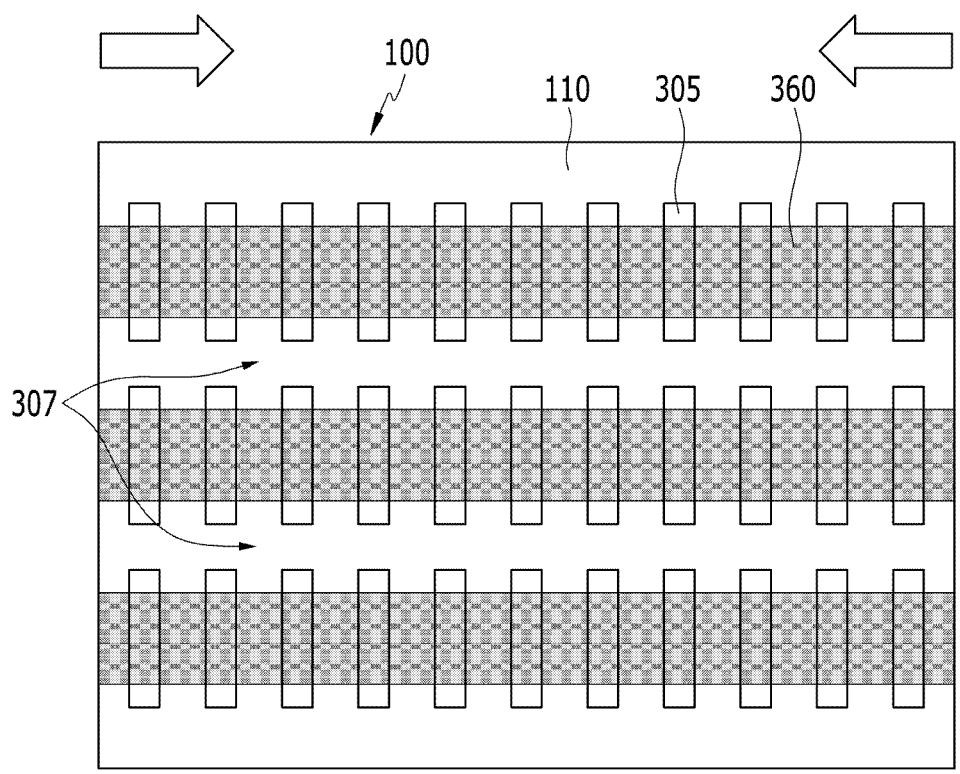
FIG. 3 is a diagram illustrating a principle of forming a curved surface of a panel long axis of the curved liquid crystal display according to an embodiment.

FIG. 1 is a perspective view illustrating a curved liquid crystal display according to an embodiment, FIG. 2 is a diagram illustrating a principle of forming a curved surface of a panel short axis of the curved liquid crystal display according to an embodiment, and FIG. 3 is a diagram illustrating a principle of forming a curved surface of a panel long axis of the curved liquid crystal display according to an embodiment.

Referring to FIG. 1, in a curved liquid crystal panel 100 according to an embodiment, both a short axis A-A and a long axis B-B of the curved liquid crystal panel 100 are formed in a curved shape.

In a general curved liquid crystal panel, only one of the short axis A-A or the long axis B-B has a curved surface, and a flat liquid crystal panel has a curved surface by using external force of an external structure.

In the liquid crystal panel 100 according to an embodiment, the liquid crystal panel itself is curved in the short axis A-A and the long axis B-B directions unlike a general curved liquid crystal panel, and heights of edges of the substrate in the short axis and the long axis directions are larger than a height of the center of the substrate.

A height of the edge of the substrate may also be larger than a height of the center of the substrate.

The larger height of the edge of the substrate means that a thickness of the liquid crystal panel is uniform, but the edge of the substrate is placed in a higher direction from a screen display direction of the liquid crystal panel, when the center of the substrate is a reference surface in the liquid crystal panel.

Next, a principle of forming the curved liquid crystal display according to an embodiment will be described with reference to FIGS. 2 and 3.

First, referring to FIG. 2B, in the liquid crystal panel 100, a principle of forming a curved surface of the short axis A-A may be formed is illustrated, and the curved liquid crystal display according to an embodiment includes a substrate 110 configuring the liquid crystal panel 100 having an EM structure, a first polarizer 12 having a polarization axis in the short axis A-A direction of the liquid crystal panel, and an adhesive layer 13 adhering the substrate 110 and the first polarizer 12.

Generally, the polarizer includes a material such as, for example, polyvinyl alcohol (PVA), polyethylene terephthalate (PET), triacetyl cellulose (TAC), or acryl.

Materials of the polarizer have contraction properties under a high-temperature and humidity condition, and as a result, the first polarizer 12 is contracted in the short-axial direction A-A of the substrate 110 which is a polarization-axial direction, when the first polarizer 12 is attached onto the substrate 110 by using the adhesive layer 13 to be processed under the high-temperature and humidity condition.

When the first polarizer 12 is contracted in the short-axial direction A-A of the substrate 110 which is the polarization-axial direction of the first polarizer 12, the substrate 110 attached onto the first polarizer 12 by the adhesive layer 13 is formed in a shape in which the entire substrate 110 is curved along both ends of the contracted first polarizer 12.

As such, the liquid crystal panel 100 curved in the short-axial A-A direction of the substrate 110 has a shape as illustrated in FIG. 2A.

Generally, the polarizers are formed on both an upper surface and a lower surface of the substrate 110, and the first polarizer 12 corresponding to an upper polarizer and a second polarizer 22 (see FIG. 6) corresponding to a lower polarizer are formed in directions of which polarization axes are orthogonal to each other. In the curved liquid crystal panel 100 according to an embodiment, the first polarizer 12 has a polarization axis in the short-axial A-A direction of the liquid crystal panel 100, and the second polarizer 22 has a polarization axis in the long-axial B-B direction of the liquid crystal panel 100.

In this state, when the polarizers are subjected to high-temperature and humidity heat treatment, the entire substrate 110 is curved in the polarization axial direction of the first polarizer 12, and the entire substrate 110 receives a force to be curved in the polarization axial direction of the second polarizer 22.

As a result, in order to prevent the substrate 110 from being curved along both ends of the second polarizer 22 by the second polarizer 22, adhesion between the second polarizer 22 and the substrate 110 may use an adhesive with improved high-temperature deformation rate in which deformation does not occur under a high-temperature condition unlike an adhesive used in the adhesive layer 13 between the first polarizer 12 and the substrate 110.

In the case of using the adhesive with improved high-temperature deformation rate, since deformation of the adhesive layer itself does not occur, the force to contract the second polarizer 22 is suppressed and thus the second polarizer 22 may not be contracted.

When the second polarizer 22 is attached onto the substrate 110, the adhesive used in adhesion of the second polarizer 22 uses the adhesive with improved high-temperature deformation rate in which deformation does not occur at a high temperature to prevent the substrate 110 from being curved along the polarization axis of the second polarizer 22.

Further, when the first polarizer 12 is attached to the substrate 110, the substrate 110 may be formed to be bent in a curved shape along a polarization axis of the first polarizer 12 by using a general adhesive which is deformed under a high temperature condition.

Next, referring to FIG. 3, the principle of forming the curved surface of the long axis B-B in the liquid crystal panel 100 is illustrated, and the curved liquid crystal panel 100 according to an embodiment includes a substrate 110, a microcavity 305 in which a liquid crystal is filled, a liquid crystal injection hole 307 for injecting the liquid crystal into the microcavity 305, and a roof layer 360 formed on the microcavity 305 horizontally along a row of the microcavity 305 except for the liquid crystal injection hole.

The roof layer 360 serves to support the microcavity 305 and the nano liquid crystal of the liquid crystal panel to be formed, and includes a material including an organic material.

A detailed structure of the curved liquid crystal panel 100 according to an embodiment is separately described below.

The roof layer 360 is formed on the entire panel except for the liquid crystal injection hole 307 in the long axial B-B direction of the liquid crystal panel with the material including the organic material, and the organic materials have a contraction property under a high-temperature and humidity condition like the materials of the polarizers. Accordingly, when the liquid crystal panel having the EM structure is processed under the high-temperature and humidity condition, the roof layer 360 including the organic material which is formed on the liquid crystal panel 100 is contracted, and as a result, the entire liquid crystal panel 100 is formedg in a curved shape along the long-axial B-B direction of the liquid crystal panel 100.

As such, the liquid crystal panel 100 has the curved surfaces having the curvatures in both the short-axial A-A and the long-axial B-B directions of the liquid crystal panel 100 under the high-temperature and humidity condition, and the curved surface formed in the short-axis A-A of the liquid crystal panel 100 and the curved surface formed in the long-axis B-B are combined to be finally formed in a concave shape of a hemisphere shape.

Next, a structure of the liquid crystal panel 100 of the curved liquid crystal display according to an embodiment is described in detail with reference to FIGS. 4 to 7.

Figure 4:
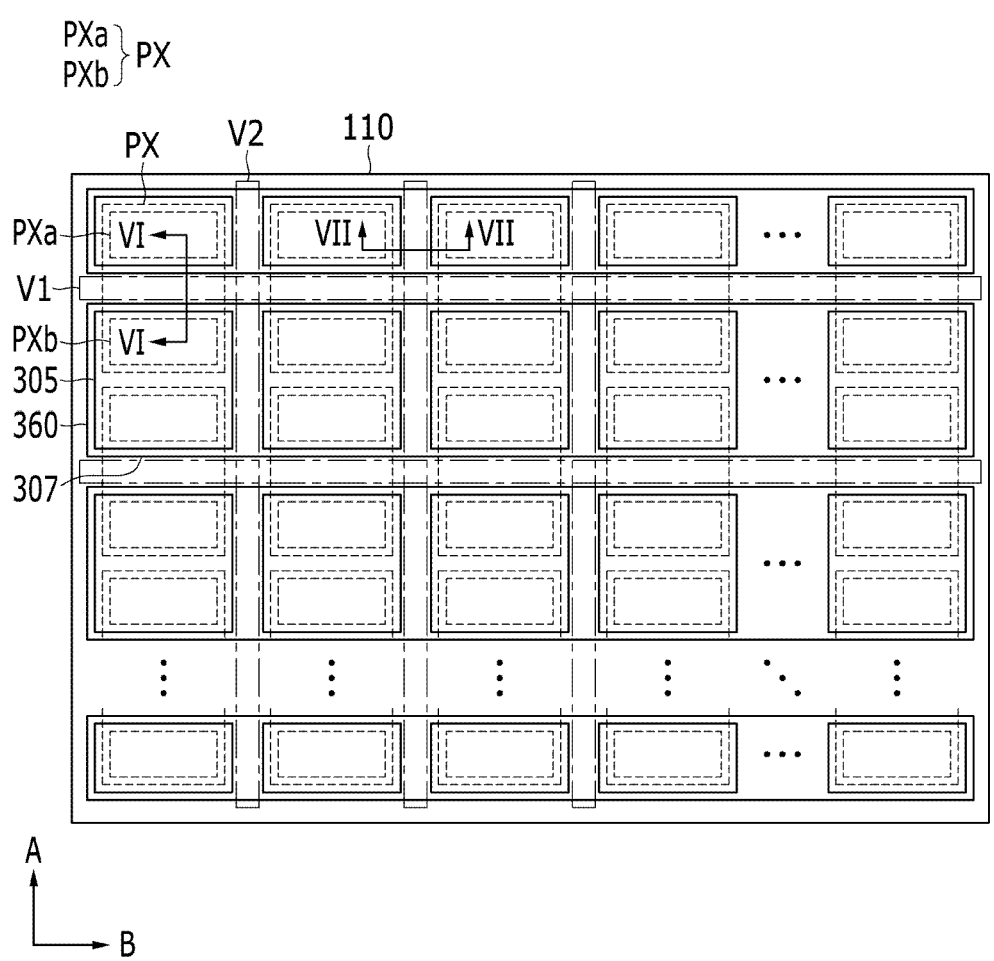
FIG. 4 is a plan view illustrating a curved liquid crystal display according to an embodiment.
Figure 5:
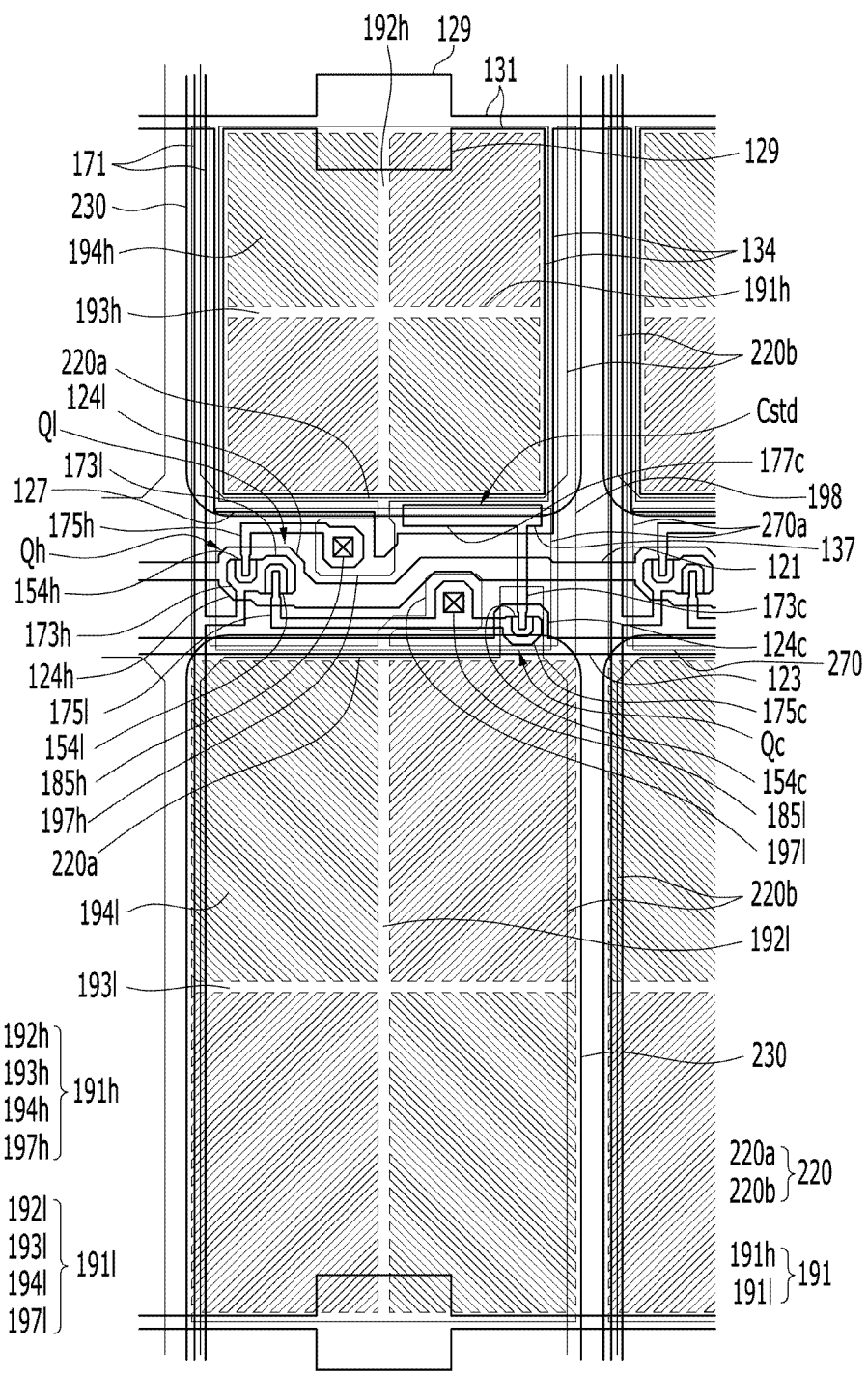
FIG. 5 is a plan view illustrating one pixel of the curved liquid crystal display according to an embodiment.
Figure 6:
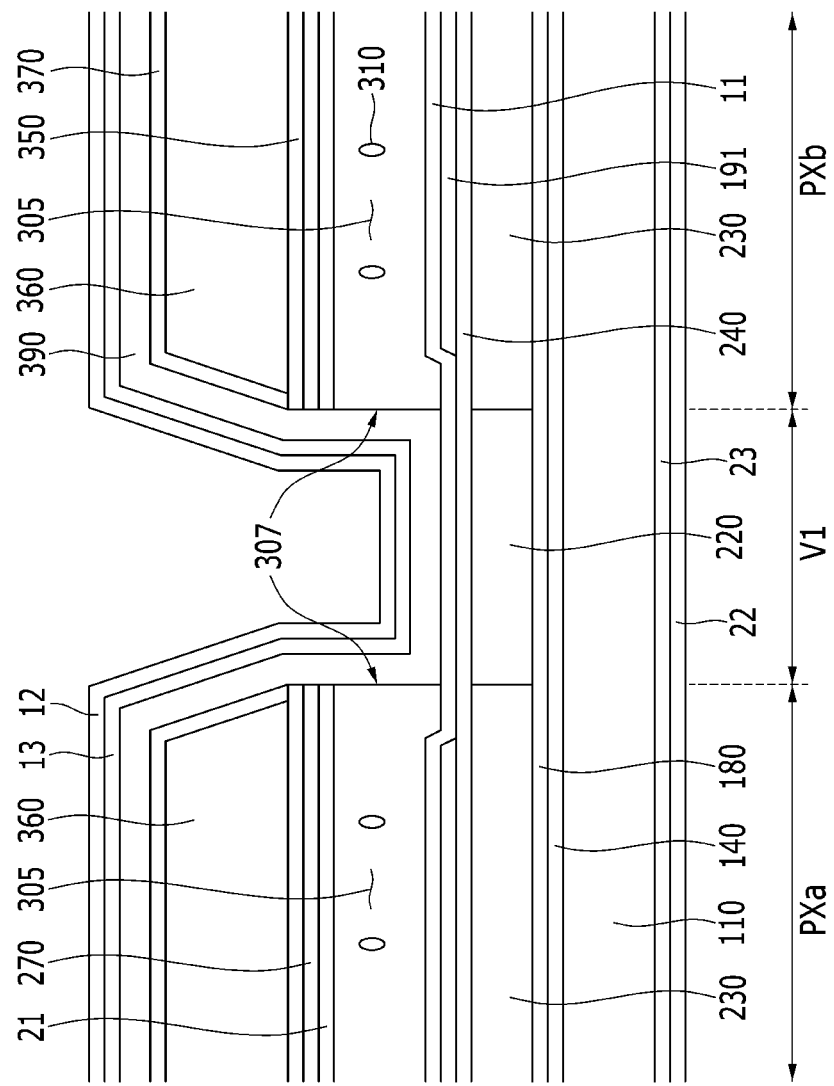
FIG. 6 is a cross-sectional view taken along line VI-VI of FIG. 4.
Figure 7:
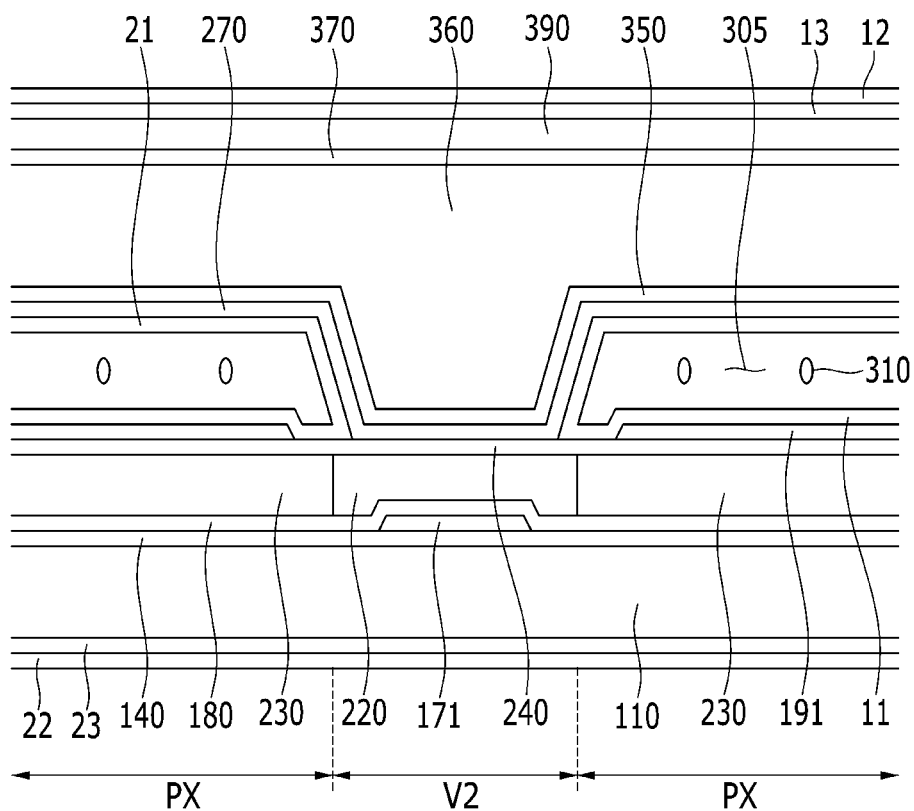
FIG. 7 is a cross-sectional view taken along line VII-VII of FIG. 4.

FIG. 4 is a plan view illustrating a curved display panel according to an embodiment, and FIG. 5 is a plan view illustrating one pixel of the curved liquid crystal panel according to an embodiment. FIG. 6 is a cross-sectional view taken along line VI-VI of FIG. 4, and FIG. 7 is a cross-sectional view taken along line VII-VII of FIG. 4.

First, referring to FIG. 4, a curved liquid crystal panel according to an embodiment includes a substrate 110 including a material such as glass or plastic, and a roof layer 360 formed on the substrate 110.

The substrate 110 includes a plurality of pixel areas PX. The plurality of pixel areas PX is disposed in a matrix form which includes a plurality of pixel rows and a plurality of pixel columns. Each pixel area PX may include a first subpixel area PXa and a second subpixel area PXb. The first subpixel area PXa and the second subpixel area PXb may be vertically disposed.

A first valley V1 is positioned between the first subpixel area PXa and the second subpixel area PXb in a pixel row direction, and a second valley V2 is positioned between a plurality of pixel columns.

The roof layer 360 is formed in a pixel row direction. The roof layer 360 is removed at the first valley V1 and thus an injection hole 307 is formed so that a constituent element positioned below the roof layer 360 is exposed to the outside.

Each roof layer 360 is formed to be separated from the substrate 110 between the adjacent second valleys V2 to form the microcavity 305. Further, each roof layer 360 is formed to be attached to the substrate 110 at the second valley V2 to cover both sides of the micro cavity 305.

A structure of the display device according to an embodiment described above is just exemplified and may be variously modified. For example, a layout form of the pixel area PX, the first valley V1, and the second valley V2 may be modified, and the plurality of roof layers 360 may be connected to each other at the first valley V1, and a part of each roof layer 360 may be separated from the substrate 110 at the second valley V2 and thus the adjacent microcavities 305 may be connected to each other.

Next, one pixel of the curved liquid crystal panel according to an embodiment is described below with reference to FIGS. 5 to 7.

FIG. 5 is a plan view illustrating one pixel of the display panel according to an embodiment, FIG. 6 is a cross-sectional view taken along line VI-VI of FIG. 4, and FIG. 7 is a cross-sectional view taken along line VII-VII of FIG. 4.

Referring to FIGS. 5 to 7, a plurality of gate conductors including a plurality of gate lines 121, a plurality of step-down gate lines 123, and a plurality of storage electrode lines 131 are formed on the substrate 110.

The gate line 121 and the step-down gate line 123 mainly extend in a horizontal direction to transfer gate signals. The gate conductor further includes a first gate electrode 124h and a second gate electrode 124l protruding upward and downward from the gate line 121, and further includes a third gate electrode 124c protruding upward from the step-down gate line 123. The first gate electrode 124h and the second gate electrode 124l are connected with each other to form one protrusion. The protrusion form of the first, second, and third gate electrodes 124h, 124l, and 124c may be modified.

The storage electrode line 131 mainly extends in a horizontal direction to transfer a predetermined voltage, such as a common voltage Vcom. The storage electrode line 131 includes storage electrodes 129 protruding upward and downward, a pair of vertical portions 134 extending downward to be substantially vertical to the gate line 121, and a horizontal portion 127 connecting ends of the pair of vertical portions 134. The horizontal portion 127 includes a capacitor electrode 137 expanded downward.

A gate insulating layer 140 is formed on the gate conductor 121, 123, 124h, 124l, 124c, and 131. The gate insulating layer 140 may include an inorganic insulating material such as, for example, silicon nitride (SiNx) or silicon oxide (SiOx). Further, the gate insulating layer 140 may include a single layer or multiple layers.

A first semiconductor 154h, a second semiconductor 154l, and a third semiconductor 154c are formed on the gate insulating layer 140. The first semiconductor 154h may be positioned on the first gate electrode 124h, the second semiconductor 154l may be positioned on the second gate electrode 124l, and the third semiconductor 154c may be positioned on the third gate electrode 124c. The first semiconductor 154h and the second semiconductor 154l may be connected to each other, and the second semiconductor 154l and the third semiconductor 154c may be connected to each other. Further, the first semiconductor 154h may be extended to the lower portion of the data line 171. The first to third semiconductors 154h, 154l, and 154c may include amorphous silicon, polycrystalline silicon, metal oxide, or the like.

Ohmic contacts (not illustrated) may be further formed on the first to third semiconductors 154h, 154l, and 154c, respectively. The ohmic contact may include silicide or a material such as n+ hydrogenated amorphous silicon in which an n-type impurity is doped at high concentration.

A data conductor including a data line 171, a first source electrode 173h, a second source electrode 173l, a third source electrode 173c, a first drain electrode 175h, a second drain electrode 175l, and a third drain electrode 175c is formed on the first to third semiconductors 154h, 154l, and 154c.

The data line 171 transfers a data signal and mainly extends in a vertical direction to cross the gate line 121 and the set-down gate line 123. Each data line 171 includes a first source electrode 173h and a second source electrode 173l which extend toward the first gate electrode 124h and the second gate electrode 124l and are connected with each other.

A first drain electrode 175h, a second drain electrode 175l, and a third drain electrode 175c include one wide end portion and a rod-shaped end portion, respectively. The rod-shaped end portions of the first drain electrode 175h and the second drain electrode 175l are partially surrounded by the first source electrode 173h and the second source electrode 173l. One wide end portion of the second drain electrode 175l is again extended to form a third source electrode 173c which is bent in a 'U'-lettered shape. A wide end portion 177c of the third drain electrode 175c is overlapped with the capacitor electrode 137 to form a set-down capacitor Cstd, and the rod-shaped end portion is partially surrounded by the third source electrode 173c.

The first gate electrode 124h, the first source electrode 173h, and the first drain electrode 175h form a first thin film transistor Qh together with the first semiconductor 154h. The second gate electrode 124l, the second source electrode 173l, and the second drain electrode 175l form a second thin film transistor Ql together with the second semiconductor 154l. The third gate electrode 124c, the third source electrode 173c, and the third drain electrode 175c form the third thin film transistor Qc together with the third semiconductor 154c.

The first semiconductor 154h, the second semiconductor 154l, and the third semiconductor 154c are connected to each other to form a stripe shape, and may have substantially the same planar shape as the data conductors 171, 173h, 173l, 173c, 175h, 175l, and 175c and the ohmic contacts therebelow, except for channel regions between the source electrodes 173h, 173l, and 173c and the drain electrodes 175h, 175l, and 175c.

In the first semiconductor 154h, an exposed portion which is not covered by the first source electrode 173h and the first drain electrode 175h is disposed between the first source electrode 173h and the first drain electrode 175h. In the second semiconductor 154l, an exposed portion which is not covered by the second source electrode 173l and the second drain electrode 175l is disposed between the second source electrode 173l and the second drain electrode 175l. In addition, in the third semiconductor 154c, an exposed portion which is not covered by the third source electrode 173c and the third drain electrode 175c is disposed between the third source electrode 173c and the third drain electrode 175c.

A passivation layer 180 is formed on the data conductor 171, 173h, 173l, 173c, 175h, 175l, and 175c and the semiconductors 154h, 154l, and 154c exposed between the respective source electrodes 173h/173l/173c and the respective drain electrodes 175h/175l/175c. The passivation layer 180 may include an organic insulating material or an inorganic insulating material, and may be formed in a single layer or in multiple layers.

A color filter 230 in each pixel area PX is formed on the passivation layer 180. Each color filter 230 may display one of primary colors such as, for example, three primary colors of red, green and blue. However, the color filter 230 is not limited to the three primary colors of red, green and blue, but may display one of cyan, magenta, yellow, and white-based colors. Unlike those illustrated above, the color filter 230 may be elongated in a column direction along a space between the adjacent data lines 171.

A light block 220 is formed in a region between the adjacent color filters 230. The light block 220 is formed on a boundary of the pixel area PX and the thin film transistor to prevent light leakage. The color filter 230 is formed in each of the first subpixel area PXa and the second subpixel area PXb, and the light block 220 may be formed between the first subpixel area PXa and the second subpixel area PXb.

The light block 220 includes a horizontal light block 220*a* which extends along the gate line 121 and the step-down gate line 123 to be expanded upward and downward, and covers regions in which the first thin film transistor Qh, the second thin film transistor Ql, and the third thin film transistor Qc are positioned, and a vertical light block 220*b* which extends along the data line 171. The horizontal light block 220*a* may be formed at the first valley V1, and the vertical light block 220*b* may be formed at the second valley V2. The color filter 230 and the light block 220 may be overlapped with each other in a partial region.

A first insulating layer 240 may be further formed on the color filter 230 and the light block 220. The first insulating layer 240 may include an inorganic insulating material such as, for example, silicon nitride (SiNx), silicon oxide (SiOx), or silicon oxynitride (SiOxNy). The first insulating layer 240 serves to protect the color filter 230 made of the organic material and the light block 220, and may be omitted if necessary.

In the first insulating layer 240, the light block 220, and the passivation layer 180, a plurality of first contact holes 185*h* and a plurality of second contact holes 185*l*, which expose the wide end portion of the first drain electrode 175*h* and the wide end portion of the second drain electrode 175*l*, respectively, are formed.

A pixel electrode 191 is formed on the first insulating layer 240. The pixel electrode 191 may include a transparent metal material such as, for example, indium tin oxide (ITO) or indium zinc oxide (IZO).

The pixel electrode 191 includes the first subpixel electrode 191*h* and the second subpixel electrode 191*l* which are separated from each other with the gate line 121 and the step-down gate line 123 therebetween, and are disposed above and below the pixel area PX based on the gate line 121 and the step-down gate line 123 to be adjacent to each other in a column direction. The first subpixel electrode 191*h* and the second subpixel electrode 191*l* are separated from each other with the first valley V1 therebetween, the first subpixel electrode 191*h* is positioned in the first subpixel area PXa, and the second subpixel electrode 191*l* is positioned in the second subpixel area PXb.

The first subpixel electrode 191*h* and the second subpixel electrode 191*l* are connected to the first drain electrode 175*h* and the second drain electrode 175*l* through the first contact hole 185*h* and the second contact hole 185*l*, respectively. Accordingly, when the first thin film transistor Qh and the second thin film transistor Ql are turned on, the first thin film transistor Qh and the second thin film transistor Ql receive data voltages from the first drain electrode 175*h* and the second drain electrode 175*l*.

An overall shape of the subpixel electrode 191*h* and the second subpixel electrode 191*l* is a quadrangle, and the first subpixel electrode 191*h* and the second subpixel electrode 191*l* include cross stems including horizontal stems 193*h* and 193*l* and vertical stems 192*h* and 192*l* crossing the horizontal stems 193*h* and 193*l*, respectively. Further, the first subpixel electrode 191*h* and the second subpixel electrode 191*l* include a plurality of minute branches 194*h* and 194*l*, and protrusions 197*h* and 197*l* protruding downward or upward from edge sides of the subpixel electrodes 194*h* and 194*l*, respectively.

The pixel electrode 191 is divided into four subregions by the horizontal stems 193*h* and 193*l* and the vertical stems 192*h* and 192*l*. The minute branches 194*h* and 194*l* obliquely extend from the horizontal stems 193*h* and 193*l* and the vertical stems 192*h* and 192*l*, and the extending direction may form an angle of approximately 45 degrees or 135 degrees with the gate line 121 or the horizontal stems 193*h* and 193*l*. Further, directions in which the minute branches 194*h* and 194*l* of the two adjacent subregions extend may be perpendicular to each other.

In an embodiment, the first subpixel electrode 191*h* further includes an outer stem surrounding the outside, and the second subpixel electrode 191*l* includes horizontal portions positioned at an upper end and a lower end, and left and right vertical portions 198 positioned at the left and the right of the first subpixel electrode 191*h*. The left and right vertical portions 198 may prevent capacitive coupling, or coupling between the data line 171 and the first subpixel electrode 191*h*.

The layout form of the pixel area, the structure of the thin film transistor, and the shape of the pixel electrode described above are just exemplified, and may be variously modified.

A common electrode 270 is formed on the pixel electrode 191 so as to be spaced apart from the pixel electrode 191 at a predetermined distance. A microcavity 305 is formed between the pixel electrode 191 and the common electrode 270. The microcavity 305 is surrounded by the pixel electrode 191 and the common electrode 270. A width and an area of the microcavity 305 may be variously modified according to a size and resolution of the display device.

The common electrode 270 may include a transparent metal material such as, for example, indium tin oxide (ITO) or indium zinc oxide (IZO). A predetermined voltage may be applied to the common electrode 270, and an electric field may be generated between the pixel electrode 191 and the common electrode 270.

A first alignment layer 11 is formed on the pixel electrode 191. The first alignment layer 11 may also be formed directly on the first insulating layer 240 which is not covered by the pixel electrode 191.

A second alignment layer 21 is formed below the common electrode 270 to face the first alignment layer 11.

The first alignment layer 11 and the second alignment layer 21 may be formed by vertical alignment layers, and include alignment materials such as, for example, polyamic acid, polysiloxane, or polyimide. The first and second alignment layers 11 and 21 may be connected to each other at an edge of the pixel area PX.

A liquid crystal layer including liquid crystal molecules 310 is formed in the microcavity 305 positioned between the pixel electrode 191 and the common electrode 270. The liquid crystal molecules 310 have negative dielectric anisotropy, and may stand up in a vertical direction to the substrate 110 while the electric field is not applied. That is, vertical alignment may be performed.

The first subpixel electrode 191*h* and the second subpixel electrode 191*l* to which the data voltage is applied generate an electric field together with a common electrode 270 to determine directions of the liquid crystal molecules 310 positioned in the microcavity 305 between two electrodes 191 and 270. As such, luminance of light passing through the liquid crystal layer varies according to the determined directions of the liquid crystal molecules 310.

A second insulating layer 350 may be further formed on the common electrode 270. The second insulating layer 350 may include an inorganic insulating material such as, for example, silicon nitride (SiNx), silicon oxide (SiOx), or silicon oxynitride, and may be omitted if necessary.

A roof layer 360 is formed on the second insulating layer 350. The roof layer 360 may include an organic material. The microcavity 305 is formed below the roof layer 360, and the roof layer 360 is hardened by a curing process to maintain the shape of the microcavity 305. The roof layer 360 is formed to be spaced apart from the pixel electrode 191 with the microcavity 305 therebetween.

The roof layer 360 is formed in each pixel area PX along a pixel row and the second valley V2, and is not formed in the first valley V1. The roof layer 360 is not formed between the first subpixel area PXa and the second subpixel area PXb. The microcavity 305 is formed below each roof layer 360 in each of the first subpixel area PXa and the second subpixel area PXb. In the second valley V2, the microcavity 305 is not formed below the roof layer 360, but formed to be attached to the substrate 110. Accordingly, a thickness of the roof layer 360 positioned at the second valley V2 may be larger than a thickness of the roof layer 360 positioned in each of the first subpixel area PXa and the second subpixel area PXb. The upper surface and both sides of the microcavity 305 have a form to be covered by the roof layer 360.

Further, the roof layer 360 may be formed to have various thicknesses in order to have various curvatures in the curved liquid crystal panel.

Injection holes 307 exposing a part of the microcavity 305 are formed in the common electrode 270, the second insulating layer 350, and the roof layer 360. The injection holes 307 may be formed to face each other at the edges of the first subpixel area PXa and the second subpixel area PXb. The injection holes 307 may correspond to the lower side of the first subpixel area PXa and the upper side of the second subpixel area PXb to expose a side of the microcavity 305. Since the microcavity 305 is exposed by the injection hole 307, an aligning agent or a liquid crystal material may be injected into the microcavity 305 through the injection hole 307.

An overcoat 390 may be formed on a third insulating layer 370. The overcoat 390 is formed to cover the injection hole 307 by which a part of the microcavity 305 is exposed outside. The overcoat 390 may seal the microcavity 305 so that the liquid crystal molecules 310 formed in the microcavity 305 are not discharged outside. Since the overcoat 390 contacts the liquid crystal molecules 310, the overcoat 390 may include a material which does not react with liquid crystal molecules 310. For example, the overcoat 390 may include parylene, or the like.

The overcoat 390 may be formed by a multilayer such as a double layer or a triple layer. The double layer may include two layers made of different materials. The triple layer may include three layers, and materials of adjacent layers are different from each other. For example, the overcoat 390 may include a layer including an organic insulating material and a layer including an inorganic insulating material.

Polarizers 12 and 22 are further formed on upper and lower surfaces of the liquid crystal display formed as described above. The polarizers 12 and 22 may include a first polarizer 12 and a second polarizer 22.

The first polarizer 12 has a polarization axis in a short-axial A-A direction of the liquid crystal panel, and the second polarizer 22 has a polarization axis in a long-axial B-B direction of the liquid crystal panel which is a direction perpendicular to the polarization axis of the first polarizer 12.

The first polarizer 12 is attached to the upper surface of the overcoat 390 as an upper side of the substrate 110, and the second polarizer 22 may be attached to a lower surface of the substrate 110.

The first polarizer 12 may be adhered by a first adhesive layer 13 including an adhesive which may be deformed at a high temperature, and the second polarizer 22 may be adhered by a second adhesive layer 23 including an adhesive with improved high-temperature deformation rate which may not be deformed at the high temperature.

Next, a manufacturing method of a curved liquid crystal display according to an embodiment is described in detail with reference to FIGS. 8 to 14.

FIGS. 8 to 14 are diagrams sequentially illustrating a manufacturing method of a curved liquid crystal display according to an embodiment.

Figure 8:
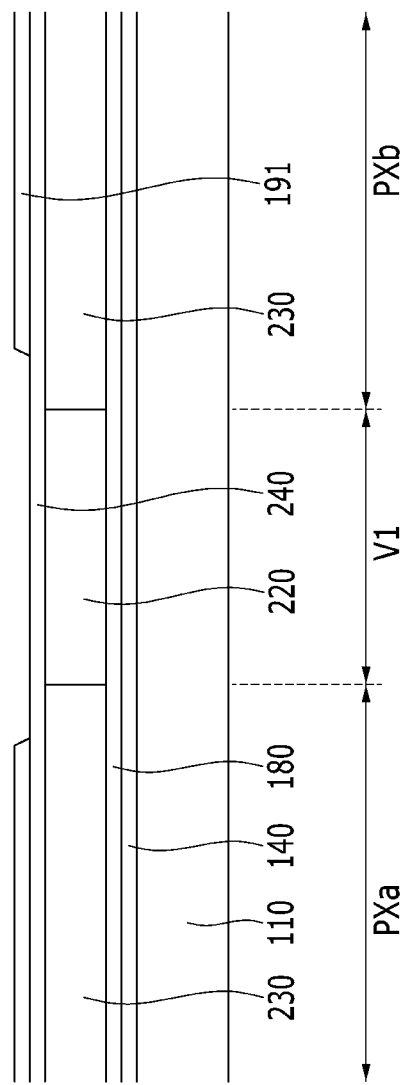
FIGS. 8 to 14 are diagrams sequentially illustrating a manufacturing method of a curved liquid crystal display according to an embodiment.

As illustrated in FIG. 8, a gate line 121 and a step-down gate line 123 extending in one direction are formed on a substrate 110 made of glass or plastic, and a first gate electrode 124h, a second gate electrode 124l, and a third gate electrode 124c which protrude from the gate line 121 are formed.

Further, a storage electrode line 131 may be formed together so as to be spaced apart from the gate line 121, the step-down gate line 123, and the first to third gate electrodes 124h, 124l, and 124c.

Next, a gate insulating layer 140 is formed on the entire surface of the substrate 110 including the gate line 121, the step-down gate line 123, the first to third gate electrodes 124h, 124l, and 124c, and the storage electrode line 131 by using an inorganic insulating material such as, for example, silicon oxide (SiOx) or silicon nitride (SiNx). The gate insulating layer 140 may be formed by a single layer or multiple layers.

Next, a first semiconductor 154h, a second semiconductor 154l, and a third semiconductor 154c are formed by depositing a semiconductor material such as, for example, amorphous silicon, polycrystalline silicon, or metal oxide on the gate insulating layer 140 and then patterning the deposited semiconductor material. The first semiconductor 154h may be positioned on the first gate electrode 124h, the second semiconductor 154l may be positioned on the second gate electrode 124l, and the third semiconductor 154c may be positioned on the third gate electrode 124c.

Next, a data line 171 extending in the other direction is formed by depositing a metal material and then patterning the deposited metal material. The metal material may be formed as a single layer or multiple layers.

A first source electrode 173h protruding above the first gate electrode 124h from the data line 171, and a first drain electrode 175h spaced apart from the first source electrode 173h are formed together. A second source electrode 173l connected with the first source electrode 173h, and a second drain electrode 175l spaced apart from the second source electrode 173l are formed together. A third source electrode 173c extended from the second drain electrode 175l, and a third drain electrode 175c spaced apart from the third source electrode 173c are formed together.

The first to third semiconductors 154h, 154l, and 154c, the data line 171, the first to third source electrodes 173h, 173l, and 173c, and the first to third drain electrodes 175h, 175l, and 175c may be formed by sequentially depositing a semiconductor material and a metal material and then patterning the semiconductor material and the metal material at the same time. The first semiconductor 154h may be extended to the lower portion of the data line 171.

The first/second/third gate electrodes 124h/124l/124c, the first/second/third source electrodes 173h/173l/173c, and the first/second/third drain electrodes 175h/175l/175c form first/second/third thin film transistors (TFTs) Qh/Ql/Qc together with the first/second/third semiconductors 154h/154l/154c, respectively.

Next, a passivation layer 180 is formed on the data line 171, the first to third source electrodes 173h, 173l, and 173c, the first to third drain electrodes 175h, 175l, and and the semiconductors 154h, 154l, and 154c exposed between the respective source electrodes 173h/173l/173c and the respective drain electrodes 175h/175l/175c. The passivation layer 180 may include an organic insulating material or an inorganic insulating material, and may be formed in a single layer or in multiple layers.

Next, a color filter 230 is formed in each pixel area PX on the passivation layer 180. The color filter 230 is formed in each of the first subpixel area PXa and the second subpixel area PXb, and may not be formed at the first valley V1. Further, the color filters 230 having the same color may be formed in a column direction of the plurality of pixel areas PX. In the case of forming the color filters 230 having three colors, a first colored color filter 230 may be first formed and then a second colored color filter 230 may be formed by shifting a mask. Next, the second colored color filter 230 may be formed and then a third colored color filter may be formed by shifting a mask.

Next, a light block 220 is formed on a boundary of each pixel area PX on the passivation layer 180 and the thin film transistor. The light block 220 may be formed even at the first valley V1 positioned between the first subpixel area PXa and the second subpixel area PXb.

Hereinabove, the light block 220 is formed after forming the color filters 230, but embodiments are not limited thereto, and the light block 220 may be formed first, and then the color filters 230 may be formed.

Next, a first insulating layer 240 including an inorganic insulating material such as, for example, silicon nitride (SiNx), silicon oxide (SiOx), or silicon oxynitride (SiOxNy) is formed on the color filter 230 and the light block 220.

Next, a first contact hole 185h is formed by etching the passivation layer 180, the first light block 220, and the first insulating layer 240 so as to expose a part of the first drain electrode 175h, and a second contact hole 185l is formed so as to expose a part of the second drain electrode 175l.

Next, a first subpixel electrode 191h is formed in the first subpixel area PXa, and a second subpixel electrode 191l is formed in the second subpixel area PXb, by depositing and patterning a transparent metal material such as, for example, indium tin oxide (ITO) or indium zinc oxide (IZO), on the first insulating layer 240. The first subpixel electrode 191h and the second subpixel electrode 191l are separated from each other with the first valley V1 therebetween. The first subpixel electrode 191h is connected with the first drain electrode 175h through the first contact hole 185h, and the second subpixel electrode 191l is connected to the second drain electrode 175l through the second contact hole 185l.

Horizontal stems 193h and 193l, and vertical stems 192h and 192l crossing the horizontal stems 193h and 193l are formed in the first subpixel electrode 191h and the second subpixel electrode 191l, respectively. Further, a plurality of minute branches 194h and 194l, which obliquely extend from the horizontal stems 193h and 193l and the vertical stems 192h and 192l, is formed.

Figure 9:
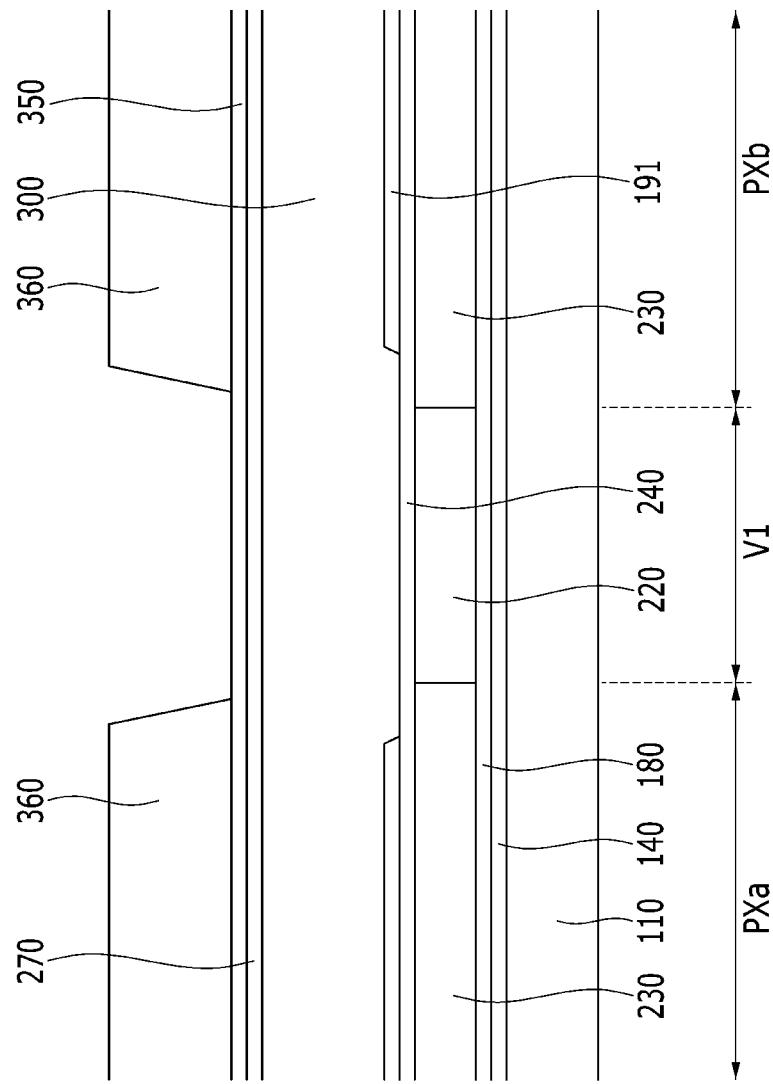

As illustrated in FIG. 9, a sacrificial layer 300 is formed by coating a photosensitive organic material on the pixel electrode 191 and performing a photolithography process.

The sacrificial layers 300 are formed to be connected to each other along the plurality of pixel columns. The sacrificial layer 300 is formed to cover each pixel area PX and to cover the first valley V1 positioned between the first subpixel area PXa and the second subpixel area PXb.

Next, a common electrode 270 is formed by depositing a transparent metal material such as, for example, indium tin oxide (ITO) or indium zinc oxide (IZO) on the sacrificial layer 300.

Next, a second insulating layer 350 may be formed on the common electrode 270 with an inorganic insulating material such as, for example, silicon nitride (SiNx), silicon oxide (SiOx), or silicon oxynitride (SiOxNy).

Next, a roof layer 360 is formed by coating and patterning an organic material on the second insulating layer 350. The organic material positioned at the first valley V1 may be patterned so as to be removed. As a result, the roof layers 360 may be formed to be connected to each other along a plurality of pixel rows.

The roof layer 360 may have various thicknesses so as to be formed to have various curvatures during high-temperature treatment in order to manufacture the curved liquid crystal panel below.

Figure 10:
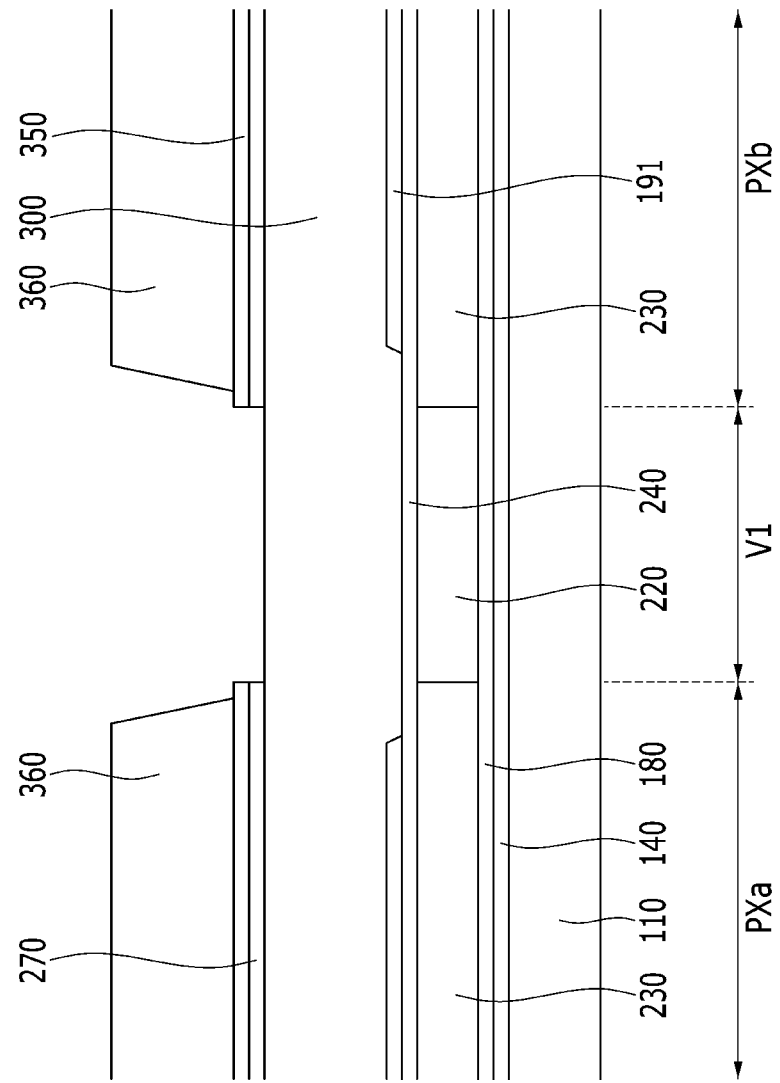

Next, as illustrated in FIG. 10, the second insulating layer 350 and the common electrode 270 are patterned by using the roof layer 360 as a mask. First, the second insulating layer 350 is dry-etched by using the roof layer 360 as a mask and then the common electrode 270 is wet-etched.

Figure 11:
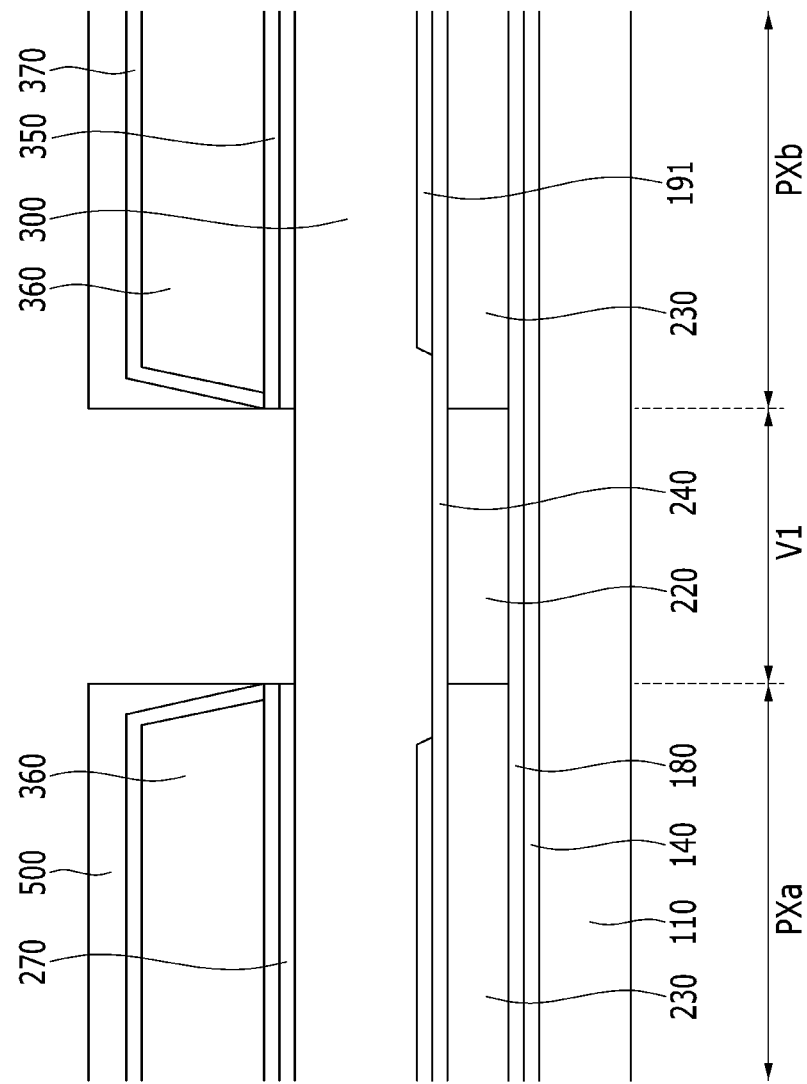

Next, as illustrated in FIG. 11, a third insulating layer 370 including an inorganic insulating material such as, for example, silicon nitride (SiNx), silicon oxide (SiOx), or silicon oxynitride (SiOxNy) may be formed on the roof layer 360.

Next, a photoresist 500 is coated on the third insulating layer 370, and the photoresist 500 is patterned by a photolithography process. The photoresist 500 positioned at the first valley V1 may be removed. The third insulating layer 370 is etched by using the patterned photoresist 500 as a mask. The third insulating layer 370 positioned at the first valley V1 is removed.

The third insulating layer 370 may be formed to cover the upper surface and the side of the roof layer 360 to protect the roof layer 360. The pattern of the third insulating layer 370 may be positioned at the outside of the pattern of the roof layer 360.

The pattern of the second insulating layer 350 may be the same as the pattern of the third insulating layer 370. Unlike this, the pattern of the second insulating layer 350 may be formed at an inside of the pattern of the roof layer 360. In this case, the third insulating layer 370 may be formed to contact the second insulating layer 350.

Hereinabove, a facility for patterning the roof layer 360 may be different from a facility for patterning the third insulating layer 370, and a difference between the patterns of the third insulating layer 370 and the roof layer 360 may be increased due to an arrangement error between the facilities. In this case, a portion where the pattern of the third insulating layer 370 is positioned at the outside of the pattern of the roof layer 360 may be sagged or broken, but since the third insulating layer 370 is not a conductive member, there is no problem such as a short circuit between the third insulating layer 370 and the pixel electrode 191.

Hereinabove, the process of forming the third insulating layer 370 is described, but embodiments are not limited thereto, and the third insulating layer 370 may not be formed. When the third insulating layer 370 is not formed, it is possible to prevent a problem which occurs due to misalignment between the facility for patterning the roof layer 360 and the facility for patterning the third insulating layer 370.

Further, since the second insulating layer 350 and common electrode 270 are patterned by using the roof layer 360 as a mask, the misalignment does not occur.

Figure 12:
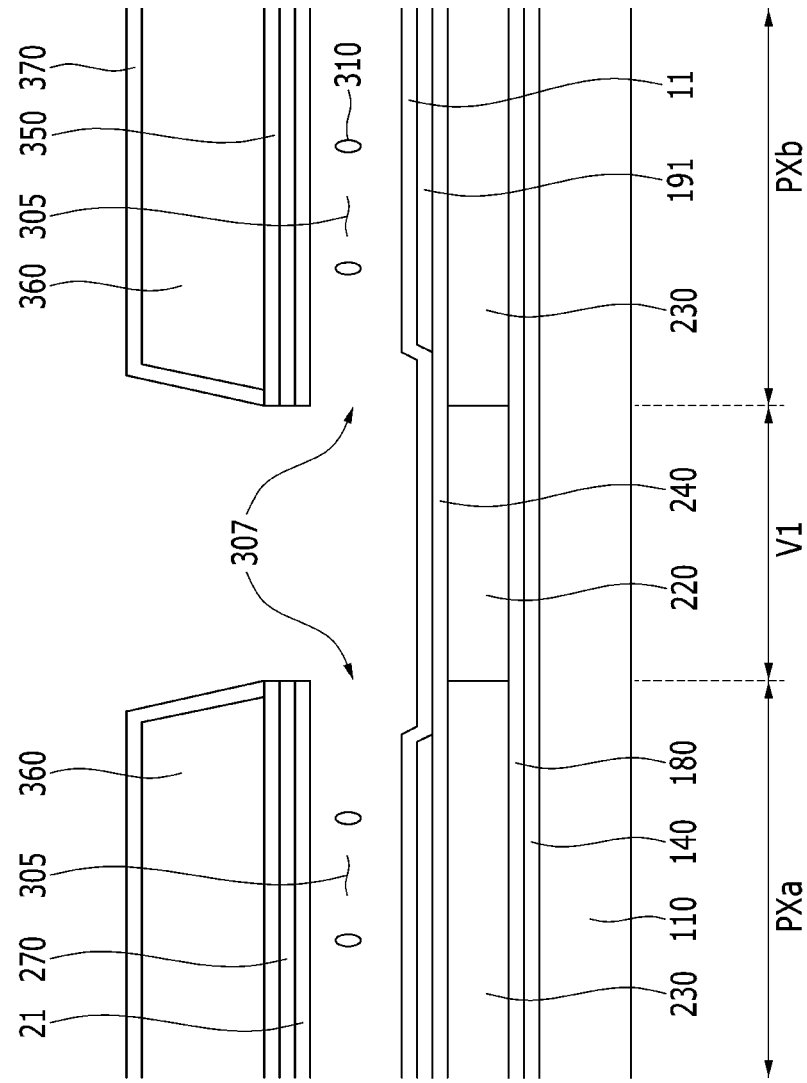

As illustrated in FIG. 12, the sacrificial layer 300 is fully removed by supplying a developer or a stripper solution onto the substrate 110 where the sacrificial layer 300 is exposed, or by using an ashing process.

When the sacrificial layer 300 is removed, the microcavity 305 is generated at a site where the sacrificial layer 300 is positioned.

The pixel electrode 191 and the common electrode 270 are spaced apart from each other with the microcavity 305 therebetween, and the pixel electrode 191 and the roof layer 360 are spaced apart from each other with the microcavity 305 therebetween. The common electrode 270 and the roof layer 360 are formed to cover the upper surface and both sides of the microcavity 305.

The microcavity 305 is exposed outside through a portion where the roof layer 360, the third insulation layer 350, and the common electrode 270 are removed, which is called the injection hole 307. The injection hole 307 may be formed along the first valley V1. For example, the injection holes 307 may be formed to face each other at the edges of the first subpixel area PXa and the second subpixel area PXb. The injection holes 307 may correspond to the lower side of the first subpixel area PXa and the upper side of the second subpixel area PXb to expose a side of the microcavity 305. Unlike this, the injection hole 307 may also be formed along the second valley V2.

Next, the roof layer 360 is cured by applying heat to the substrate 110. This helps maintain the shape of the space 305 by the roof layer 360.

Next, when an aligning agent containing an alignment material drops on the substrate 110 by a spin coating method or an inkjet method, the aligning agent is injected into the microcavity 305 through the injection hole 307. When the aligning agent is injected into the microcavity 305 and then a curing process is performed, a solution component is evaporated, and the alignment material remains on the inner wall of the microcavity 305.

Accordingly, the first alignment layer 11 may be formed on the pixel electrode 191, and the second alignment layer 21 may be formed below the common electrode 270. The lower alignment layer 11 and the upper alignment layer 21 face each other with the space 305 therebetween and are connected to each other at an edge of the pixel area PX.

In this case, the first and second alignment layers 11 and 21 may be aligned in a vertical direction to the substrate 110, except for the side of the microcavity 305. In addition, a process of irradiating a UV to the first and second alignment layers 11 and 21 is performed, and as a result, the first and second alignment layers 11 and 21 may be aligned in a horizontal direction to the substrate 110.

Next, when the liquid crystal material constituted by liquid crystal molecules 310 drops on the substrate 110 by an inkjet method or a dispensing method, the liquid crystal material is injected into the microcavity 305 through the injection hole 307. In this case, the liquid crystal material may drop in the injection holes 307 formed along the odd-numbered first valleys V1 and may not drop in the injection holes 307 formed along the even-numbered first valleys V1. On the contrary, the liquid crystal material may drop in the injection holes 307 formed along the even-numbered first valleys V1 and may not drop in the injection holes 307 formed along the odd-numbered first valleys V1.

When the liquid crystal material drops in the liquid crystal injection holes 307 formed along the odd-numbered first valleys V1, the liquid crystal material passes through the liquid crystal injection hole 307 by capillary force to be injected into the microcavity 305. In this case, the liquid crystal material is injected into the microcavity 305 by discharging air in the microcavity 305 through the liquid crystal injection holes 307 formed along the even-numbered first valleys V1.

Further, the liquid crystal material may drop in all of the injection holes 307. The liquid crystal material may drop in the injection holes 307 formed along the odd-numbered first valleys V1 and the injection holes 307 formed along the even-numbered first valleys V1.

Figure 13:
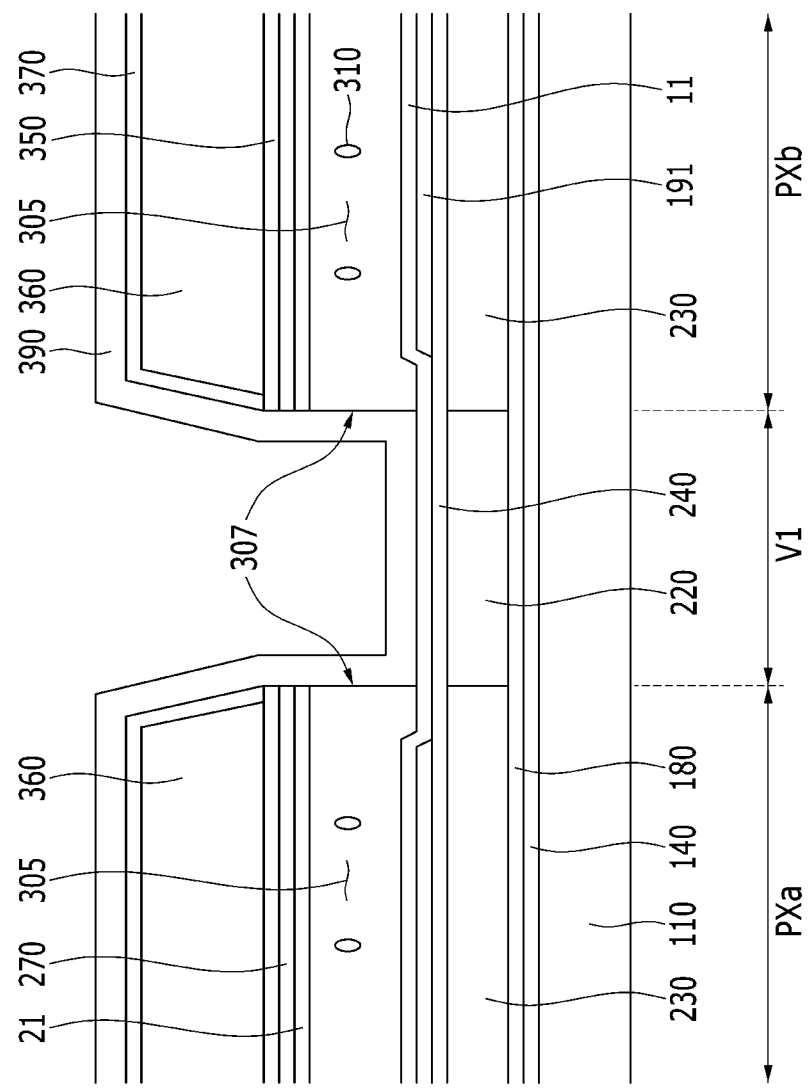

As illustrated in FIG. 13, an overcoat 390 is formed by depositing a material which does not react with the liquid crystal molecules 310 on the third insulating layer 370. The overcoat 390 is formed to cover the injection hole 307 where the microcavity 305 is exposed outside to seal the microcavity 305.

Figure 14:
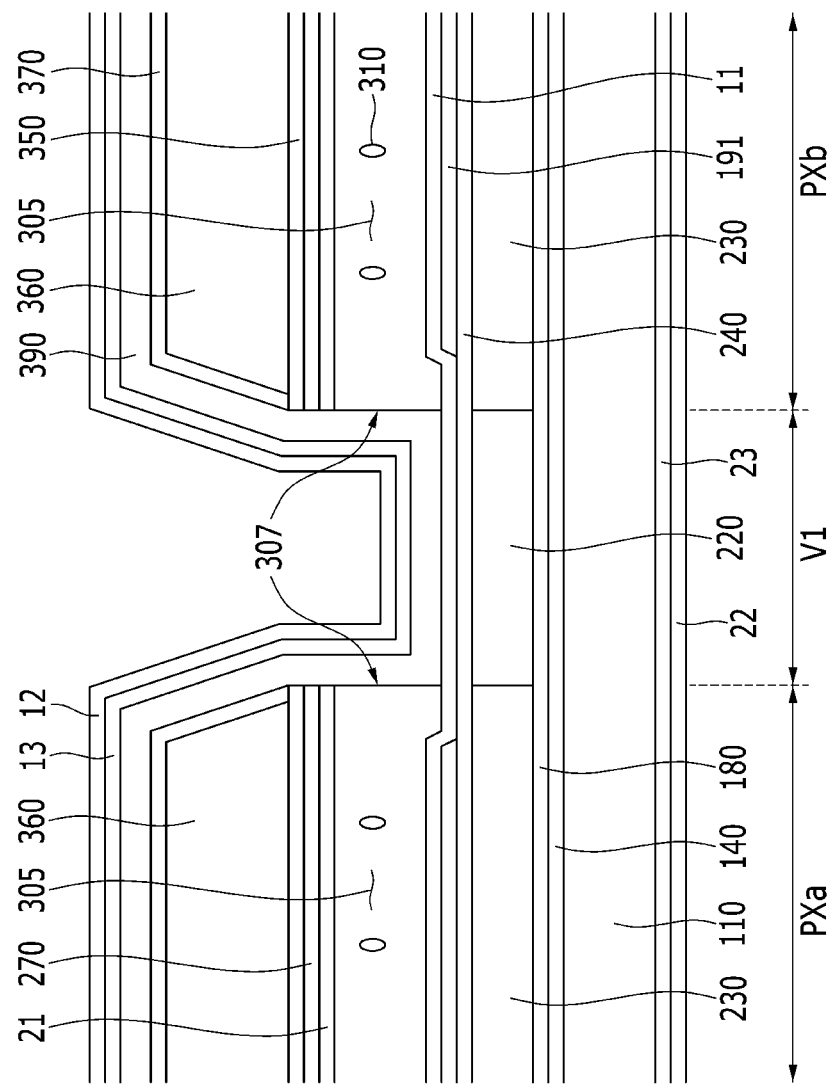

Next, as illustrated in FIG. 14, the first polarizer 12 and the second polarizer 22 are attached to the upper and lower surfaces of the liquid crystal panel by using the adhesive, respectively.

The first polarizer 12 is formed to have a polarization axis in a short-axial A-A direction of the liquid crystal panel, and the second polarizer 22 is formed to have a polarization axis in a long-axial B-B direction of the liquid crystal panel which is a direction perpendicular to the polarization axis of the first polarizer 12.

The first polarizer 12 may be attached to the upper surface of the overcoat 390, and the second polarizer 22 may be attached to a lower surface of the substrate 110.

The first polarizer 12 may be adhered by a first adhesive layer 13 including an adhesive which may be deformed at a high temperature, and the second polarizer 22 may be adhered by a second adhesive layer 23 including an adhesive with improved high-temperature deformation rate which may not be deformed at the high temperature.

Thereafter, the completed liquid crystal panel 100 has a curved surface through heat treatment under a high-temperature and humidity condition, and has a curved surface having curvatures in both directions of the short axis A-A and the long axis B-B of the liquid crystal panel 100.

The heat treatment for forming the liquid crystal panel 100 in the curved shape may vary according to a curvature of a curved surface to be formed, but may be performed for about 50 to 300 hours at about 50 to 70° C., and the heat treatment condition is not limited thereto.

The curved liquid crystal display according to an embodiment is completed through the heat treatment.

In order to verify that the liquid crystal panel 100 having the EM structure is curved in the long-axial B-B direction of the liquid crystal panel 100 under the high-temperature and humidity condition, the high-temperature and humidity heat treatment is performed by attaching the second polarizer 22 having the polarization axis in the long-axial B-B direction of the liquid crystal panel 100 to the upper surface or the lower surface of the liquid crystal panel 100 having the EM structure. As a Comparative Example, the high-temperature and humidity heat treatment is performed by attaching the first polarizer 12 having the polarization axis in the short-axial A-A direction of the liquid crystal panel 100 to the upper surface or the lower surface of the liquid crystal panel 100 having the EM structure. The result is illustrated in FIG. 15, where FIG. 15(a) illustrates a result of forming the curved surface of the liquid crystal panel 100 according to the Comparative Example, and FIG. 15(b) illustrates a result of forming the curved surface of the liquid crystal panel 100 according to an embodiment.

Figure 15:
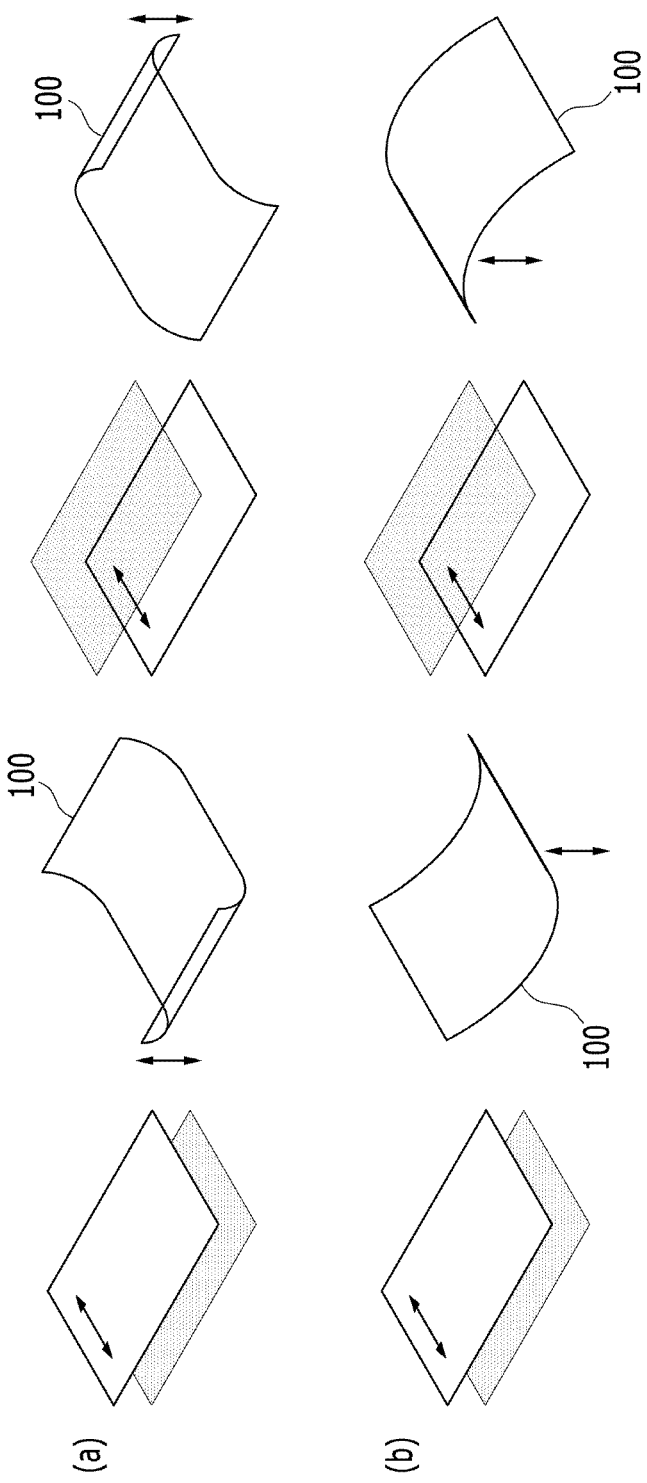
FIG. 15 is a result of measuring bending degrees of panels of a curved liquid crystal display according to an embodiment and a curved liquid crystal display according to a Comparative Example.

As illustrated in FIG. 15, in the case of attaching the first polarizer 12 having the polarization axis in the short-axial A-A direction of the liquid crystal panel 100, the liquid crystal panel 100 is bent by about 6 mm in both cases of attaching the first polarizer 12 to the upper surface and the lower surface, and as a result, it is verified that formation of the curved surface due to other effects other than formation of the curved surface by the first polarizer 12 does not exist in the short-axial A-A direction of the liquid crystal panel 100.

However, when the second polarizer 22 having the polarization axis in the long-axial B-B direction of the liquid crystal panel 100 is attached to the upper surface of the liquid crystal panel 100, the liquid crystal panel 100 is bent by about 16 mm, but when the second polarizer 22 is attached to the lower surface of the liquid crystal panel 100, the liquid crystal panel 100 is bent by about 11 mm, and as a result, it is verified that another force other than the formation of the curved surface by the second polarizer 22 is applied.

Accordingly, in the liquid crystal panel 100 having the EM structure, it is verified that tensile stress due to the roof layer including the organic material exists in the long-axial B-B direction of the liquid crystal panel 100.

In order to measure a bending degree of the liquid crystal panel according to a thickness of the liquid crystal panel, when the thicknesses of the liquid crystal panel are about 0.5 mm and about 0.7 mm, the bending degree of the liquid crystal panel is measured in the case of attaching only the first polarizer, the case of attaching only the second polarizer, and the case of attaching both the first polarizer and the second polarizer. The result is illustrated in FIG. 16.

As illustrated in FIG. 16, in the case of a liquid crystal panel of 0.5 mm, the liquid crystal panel is bent by 5 mm, 14 mm, and 2 mm in the case of attaching only the first polarizer, the case of attaching only the second polarizer, and the case of attaching both the first polarizer and the second polarizer, respectively, and as a result, it is verified that the liquid crystal panel of 0.5 mm is more bent than a liquid crystal panel of 0.7 mm in all the cases. Accordingly, it is verified that a curved liquid crystal display having a larger curvature may be manufactured as a thickness of the liquid crystal panel is smaller.

Next, in order to determine the bending degree of the liquid crystal panel according to a size of the liquid crystal panel, after the second polarizers having the polarization axis in the long-axial direction of the panel are attached to a liquid crystal panel of about 10.1 inches and a liquid crystal panel of about 15 inches, the bending degree is measured. The result is illustrated in FIG. 17.

As illustrated in FIG. 17, as the liquid crystal panel is increased, the bending degree generally represents a linear relationship, and as a result, it is verified that the size of the liquid crystal panel and the bending degree of the liquid crystal panel by the polarizer are constant.

In order to compare bending degrees of the liquid crystal panel having the EM structure with the roof layer and a general substrate, the bending degrees by attaching the polarizers to the liquid crystal panel having the EM structure with the roof layer and the substrate which have the same thickness were measured. The result is illustrated in FIG. 18.

Figure 18:
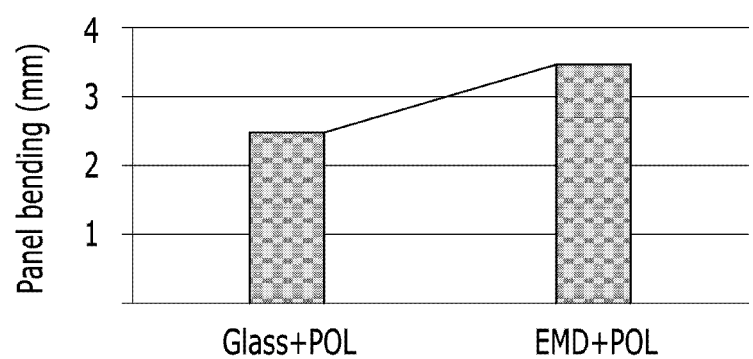
FIG. 18 is a graph illustrating measuring bending degrees of panels of a curved liquid crystal display according to an embodiment and a curved liquid crystal display according to a Comparative Example.

As illustrated in FIG. 18, in the case where the polarizer is attached to the substrate, the liquid crystal panel is bent by about 2.5 mm, but in the case where the polarizer is attached to the liquid crystal panel having the EM structure with the roof layer, the liquid crystal panel is bent by about 3.5 mm, and as a result, it is verified that the bending degree of the liquid crystal panel is increased by about 1.4 times.

In order to determine the bending degree of the liquid crystal panel according to a kind of adhesive for attaching the polarizer to the liquid crystal panel, after the polarizers are attached to a panel of about 15 inches and a panel of about 10.1 inches by using an adhesive having high-temperature deformation and an adhesive with improved high-temperature deformation rate which is not deformed at a high temperature, respectively, the bending degrees of the liquid crystal panels were measured. The result is illustrated in FIG. 19.

As illustrated in FIG. 19, in the case of the liquid crystal panel of 15 inches, as compared with the case where the adhesive with improved high-temperature deformation rate is not used, when the adhesive with improved high-temperature deformation rate is used, the bending degree of the liquid crystal panel is decreased from 3.5 mm to 2.5 mm, and in the case of the liquid crystal panel of 10.1 inches, when the adhesive with improved high-temperature deformation rate is used, the liquid crystal panel is not bent at all. As a result, it is verified that the bending degrees of the liquid crystal panels may be different from each other according to a kind of adhesive.

Accordingly, when the liquid crystal display having a curved surface concaved in a hemispherical shape according to an embodiment is manufactured, in the case of the first polarizer attached to the upper surface of the liquid crystal panel, it is verified that the adhesive having the deformation property at a high temperature may be used in order to form the liquid crystal panel in a curved shape. Further, in the case of the second polarizer attached to the lower surface of the liquid crystal panel, when the second polarizer is contracted by heat treatment, the liquid crystal panel is bent in a convex direction, and as a result, in order to prevent the second polarizer from being contracted by heat treatment, it is verified that the adhesive with improved high-temperature deformation rate needs to be used.

In order to measure a luminance value of the curved liquid crystal display according to an embodiment, in the curved liquid crystal display having the curved surface only in the long-axial direction of the liquid crystal panel in the Comparative Example and the curved liquid crystal display having the curved surfaces in both long-axial and short-axial directions of the liquid crystal panel according to an embodiment, luminance values were measured. The result is illustrated in FIG. 20, where FIG. 20(a) illustrates an experimental result of an embodiment, and FIG. 20(b) illustrates an experimental result of a Comparative Example.

As illustrated in FIG. 20, in the curved liquid crystal display according to an embodiment, the luminance value is increased as compared with the curved liquid crystal display having a curved surface only in one direction of the liquid crystal panel.

Figure 21:
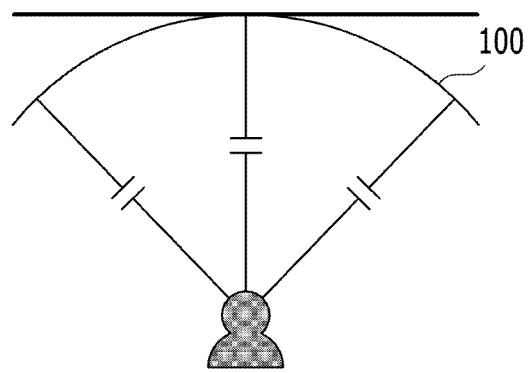
FIG. 21 is a diagram illustrating a principle of compensating for a viewing difference of a user in a curved liquid crystal display according to an embodiment.

In the curved liquid crystal display according to an embodiment and the curved liquid crystal display manufactured by a manufacturing method thereof, as illustrated in FIG. 21, distances of a case where a viewer views the center of the screen and a case where the viewer views left and right ends of the screen are similarly or equally prepared, thereby reducing a viewing difference and increasing presence.

As described above, according to an embodiment, the curved surfaces may be formed at both axes including the long axis and the short axis of the liquid crystal panel, and as a result, as the screen is increased, the viewing difference may be compensated, and the presence is excellent. When the liquid crystal panel is formed in the curved shape, the liquid crystal panel itself has the curved surface without external force, and as a result, spots due to light leakage may be prevented, and the luminance is excellent.

While this invention has been described in connection with certain embodiments, it is to be understood that the invention is not limited to the disclosed embodiments, but, on the contrary, is intended to cover various modifications and equivalent arrangements included within the spirit and scope of the appended claims.

What is claimed is:

1. A manufacturing method of a liquid crystal display, comprising:
    forming a thin film transistor on a substrate;
    forming a pixel electrode on the thin film transistor;
    forming a sacrificial layer on the pixel electrode;
    forming a common electrode on the sacrificial layer;
    forming a roof layer and an injection hole on the common electrode in a long-axial direction of the substrate;
    forming a microcavity between the pixel electrode and the common electrode by removing the sacrificial layer;
    forming a liquid crystal layer by injecting a liquid crystal material into the microcavity;
    attaching a first polarizer having a polarization axis in a short-axial direction of the substrate on the roof layer;
    forming a first adhesive layer between the first polarizer and the roof layer;
    attaching a second polarizer having a polarization axis in a long-axial direction of the substrate below the substrate;
    forming a second adhesive layer disposed between the second polarizer and the substrate; and
    heat-treating the substrate to be bent only in a polarization axial direction of the first polarizer and in a direction of the roof layer,
    wherein heights of edges in the long-axial and short-axial directions of the substrate is larger than a height of the center of the substrate,
    wherein the first adhesive layer includes a material which is deformed according to a temperature,
    wherein the second adhesive layer includes a material which is not deformed according to the temperature, and
    wherein the substrate is formed to have a concaved hemispherical shape.

2. The manufacturing method of a liquid crystal display of claim 1, wherein:
    a polarization axis of the first polarizer is vertical to a polarization axis of the second polarizer.

3. The manufacturing method of a liquid crystal display of claim 1, wherein:
    the first polarizer and the second polarizer each include at least one of polyvinyl alcohol (PVA), polyethylene terephthalate (PET), triacetyl cellulose (TAC), or acryl.

4. The manufacturing method of a liquid crystal display of claim 3, wherein:
    the roof layer includes an organic material.

5. The manufacturing method of a liquid crystal display of claim 4, wherein:
    the roof layer is disposed to form a plurality of rows along the long-axial direction of the substrate.

6. The manufacturing method of a liquid crystal display of claim 5, wherein:
    the heat treatment of the substrate is performed at about 50 to about 70° C. for about 50 to 300 hours.

7. The manufacturing method of a liquid crystal display of claim 1, further comprising:
    forming an overcoat between the first polarizer and the roof layer.

8. The manufacturing method of a liquid crystal display of claim 1, wherein:
    the curved liquid crystal display has constant distances from all surfaces of the curved liquid crystal display based on a user separated from the center of the curved liquid crystal display in a vertical direction at a predetermined distance.

* * * * *